United States Patent
Shan et al.

(10) Patent No.: US 6,700,929 B1
(45) Date of Patent: Mar. 2, 2004

(54) METHOD AND APPARATUS FOR MULTIPATH PARAMETER ESTIMATION IN SPREAD-SPECTRUM COMMUNICATIONS SYSTEMS

(75) Inventors: Peijun Shan, Jamestown, NC (US); Eric J. King, Greensboro, NC (US)

(73) Assignee: RF Micro Devices, Inc., Greensboro, NC (US)

( * ) Notice: Subject to any disclaimer, the term of this patent is extended or adjusted under 35 U.S.C. 154(b) by 613 days.

(21) Appl. No.: 09/628,972

(22) Filed: Jul. 31, 2000

(51) Int. Cl.[7] .............................................. H04B 17/00
(52) U.S. Cl. ..................... 375/224; 375/349; 370/252; 324/76.14; 324/613; 455/65; 455/67.3
(58) Field of Search ................................ 375/140, 144, 375/224, 148, 348, 349, 317; 370/248, 252; 455/63, 65, 67.3, 67.6; 324/76.14, 613

(56) References Cited

U.S. PATENT DOCUMENTS

| | | | |
|---|---|---|---|
| 5,077,753 A | 12/1991 | Grau, Jr. et al. | 375/1 |
| 5,361,276 A | 11/1994 | Subramanian | 375/1 |
| 5,414,734 A | 5/1995 | Marchetto et al. | 375/267 |
| 5,673,286 A | 9/1997 | Lomp | 375/148 |
| 5,689,528 A | 11/1997 | Tsujimoto | 375/233 |
| 5,692,008 A | * 11/1997 | Van Nee | 375/148 |
| 5,809,060 A | 9/1998 | Cafarella et al. | 375/206 |
| 5,995,538 A | 11/1999 | Lomp | 375/142 |
| 6,009,089 A | 12/1999 | Huang et al. | 370/342 |
| 6,069,917 A | 5/2000 | Werner et al. | 375/233 |
| 6,075,812 A | 6/2000 | Cafarella et al. | 375/206 |
| 6,333,947 B1 | * 12/2001 | van Heeswyk et al. | 375/148 |
| 6,541,950 B2 | * 4/2003 | Townsend et al. | 324/76.14 |

FOREIGN PATENT DOCUMENTS

EP        0981206 A1      2/2000 ............ H04B/1/707

WO        WO 98/26544    6/1998 ............ H04L/25/03

OTHER PUBLICATIONS

Andren, Carl, and Webster, Mark, "CCK Modulation Delivers 11Mbps for High Rate IEEE 802.11 Extension," Wireless Symposium/Portable by Design Conference Proceedings, Mar. 14, 2000, XP002147321.

Fuente, M. P., Guo, Y. J., and Barton, S. K., "A New Scheme for Direct Sequence Spread Spectrum Radio LANs," IEEE 4th International Symposium, Mainz Germany, Sep. 22–25, 1996, XP010208831.

(List continued on next page.)

*Primary Examiner*—Amanda T. Le
(74) *Attorney, Agent, or Firm*—Withrow & Terranova, PLLC

(57) ABSTRACT

A training method provides an advantageous technique for estimating secondary propagation path parameters based on learning propagation path characteristics for a selected number of secondary propagation path signals. In a multipath environment, a received radio signal comprises multiple received signals, each received through a different signal propagation path. The strongest multipath signal is deemed the main path signal, while the remaining multipath signals are termed secondary path signals. In some types of direct-sequence, spread spectrum communications systems, significant secondary signals must be canceled from the received multipath signal to achieve desired receiver performance, while in other types of systems, such secondary signals may be used to enhance the signal-to-noise ratio of the received signal. In either case, the various multipath signals must be accurately characterized. The training method includes a course search technique that yields initial identification of the significant secondary path signals, and further includes techniques for characterizing the magnitude, phase, and path delay, all relative to the main path signal for secondary path signal of interest. The training method employs differential decoding and sample phase slicing to improve parameter estimation accuracy, and further includes phase correlation operations to determine secondary path delay, where such delays may have delay spreads that exceed a transmitted signal symbol period.

36 Claims, 14 Drawing Sheets

OTHER PUBLICATIONS

Hou, Wen–Shang, and Chen, Bor–Sen, "Adaptive Detection in Asynchronous Code–Division Multiple–Access System in Multipath Fading Channels," IEEE Transactions on Communications, vol. 48, No. 5, May 2000, pp. 863–874.

Kim, Su Il, and Lee, Hwang Soo, "Performance Improvement of RAKE Receiver for a Multicode DS–CDMA System with Multistage Interference Cancellation Detectors," Proceedings of IEEE Tencon '99, Sep. 15–17, 1999, vol. 1, pp. 573–576.

3COM Corporation, "IEEE 802.11b Wireless LANs." http://www.3com.com/technology/tech_net/white_papers/503072a.html.

Prasad, Ramjee and Ojanperä, Tero, "An Overview of CDMA Evolution Toward Wideband CDMA," IEEE Communications Surveys, 1998. http://www.comsoc.org/pubs/surveys/4q98issue/prasad.html.

* cited by examiner

MAIN SAMPLES

| 45° | 90° | 180° | 135° | 0° |
|---|---|---|---|---|
| 1 | 2 | 3 | 4 | 5 |

$P_{-1}$ $P_0$ $P_{+1}$

| 76° | 112° | 204° | 158° | 32° |
|---|---|---|---|---|
| 1 | 2 | 3 | 4 | 5 |

$P_{-1}$ $P_0$ $P_{+1}$

SECONDARY SAMPLES — 720, 730

$\theta_0 = P_{-1}(\text{SECONDARY}) - P_0(\text{MAIN}) = 76 - 180 = -104°$
$\theta_1 = P_0(\text{SECONDARY}) - P_0(\text{MAIN}) = 112 - 180 = -68°$
$\theta_2 = P_0(\text{SECONDARY}) - P_{-1}(\text{MAIN}) = 112 - 90 = 22°$ SELECT $\theta_2$

FIG. 7C

METHOD AND APPARATUS FOR MULTIPATH PARAMETER ESTIMATION IN SPREAD-SPECTRUM COMMUNICATIONS SYSTEMS

FIELD OF THE INVENTION

The present invention generally relates to direct-sequence spread spectrum (DSSS) communications systems, and particularly relates to characterizing multipath propagation characteristics in DSSS receivers.

BACKGROUND OF THE INVENTION

In wireless communications systems, successfully extracting transmitted information from a received signal oftentimes requires overcoming significant levels of interference. Multipath interference represents one type of received signal interference that can be particularly problematic in certain types of wireless communications systems. For example, wireless LANs are typically employed in indoor environments that commonly include partitioned walls, furniture, and multiple doorways, along with various metallic and non-metallic building features. In these environments, transmitted signals follow multiple transmission paths of differing lengths and attenuation. Consequently, a receiver in such an environment receives multiple, time-offset signals of differing signal strengths. These multiple versions of the same transmit signal are termed "multipath signals."

The effect of multipath signals on DSSS receiver performance depends upon the particulars of the communications system in question. For example, in certain types of DSSS communications systems, multipath signals can actually improve receiver signal-to-noise ratio. To understand this phenomenon, it is helpful to highlight a few basic aspects of DSSS communications. DSSS transmitters essentially multiply an information signal by a pseudo-noise (PN) signal—a repeating, pseudo-random digital sequence. Initially, the information signal is spread with the PN signal, and the resultant spread signal is multiplied with the RF carrier, creating a wide bandwidth transmit signal. In the general case, a receiver de-spreads the received signal by multiplying (mixing) the incoming signal with the same PN-spread carrier signal. The receiver's output signal has a maximum magnitude when the PN-spread signal exactly matches the incoming received signal. In DSSS systems, "matching" is evaluated based on correlating the incoming PN-sequenced signal with the receiver's locally generated PN-sequenced signal.

The spreading code (PN code) used by the transmitter to spread the information signal significantly influences the effects of multipath signals on receiver performance. DSSS transmissions based on a single spreading code with good autocorrelation properties (or on a small set of orthogonal spreading codes) allow the receiver to selectively de-correlate individual signals within a multipath signal relatively free of interference from the other signals within the multipath signal. By adjusting the PN-sequence offset used to generate its local PN despreading signal, the receiver can time-align (code phase) its despreading circuitry with any one of the multipath signals it is receiving. If the spreading/despreading PN code has good autocorrelation and cross-correlation properties, the receiver can recover the transmitted data from any one of these multipath signals without undue interference. Of course, it may be preferable to use only the strongest multipath signal(s) for information recovery.

Indeed, conventional RAKE receivers used in Code-Division Multiple Access (CDMA) digital cellular telephone systems exploit the above situation. CDMA transmissions use a relatively long, fixed spreading code for a given receiver and transmitter pair, which results in very favorable auto- and cross-correlation characteristics. RAKE receivers are well known in the art of digital cellular receiver design. A RAKE receiver includes multiple, parallel "RAKE fingers." Each RAKE finger can independently synchronize with and de-spread a received signal.

By synchronizing the multiple RAKE fingers to the strongest received multipath signals (those with the highest correlation values), the RAKE fingers lock on to the strongest multipath signals. Because of the excellent correlation properties of the CDMA spreading codes, each RAKE finger synchronizes with and de-spreads one of the multipath signals relatively free from interference associated with the other multipath signals. Thus, each RAKE finger de-spreads a relatively clean signal and this allows the overall RAKE receiver to coherently combine (with time/phase alignment) the signals to form a combined output signal that represents the addition of the multipath signals. Coherently combining the multipath signals allows the RAKE receiver to achieve an improvement in signal-to-noise ratio (SNR), essentially meaning that multipath signals can actually improve reception performance in certain types of spread spectrum systems.

Unfortunately, the characteristics of many other types of spread spectrum communications systems greatly complicate how a receiver deals with multipath signals. Some types of DSSS systems use spreading codes with poor correlation properties. The IEEE standard for high data-rate wireless LANs, known as 802.11b, is a primary example of such a system. Standard IEEE 802.11 transmissions use a single spreading code combined with binary phase-shift keying (BPSK) or quadrature phase-shift keying (QPSK) to transmit data at 1 or 2 Mbps, respectively. The 802.11b extensions provide higher data rates by defining 5.5 and 11 Mbps transmission rates. These higher data rates use a modulation format known as Complimentary Code Keying (CCK). 802.11b CCK-mode transmissions use multiple spreading codes, and the spreading codes change across symbols. While providing the ability to achieve high data transfer rates and still maintain compatibility with the standard 802.11 and 2 Mbps channelization scheme, CCK modulation does include the drawback of making it more difficult for receivers to cleanly despread individual multipath signals.

Indeed, due to the relatively poor correlation properties of the spreading codes used in 802.11b, the various multipath signals can interfere with each other and result in intersymbol interference (ISI) at the receiver. Thus, in contrast to the CDMA digital cellular scenario, multipath signals can significantly degrade receiver performance in systems operating under 802.11b standards. Of course, multipath signals may be problematic in any type of DSSS system that uses less-than-ideal spreading codes, so the problem is not limited to wireless LAN applications. Multipath interference in DSSS systems arises from both inter-chip interference (ICI) and ISI. For the purposes of this disclosure the term ISI is understood to include both ICI and ISI. From the perspective of a DSSS receiver, each transmitted symbol results in the reception of multiple symbols arriving with relative time offsets from each other, due to the multiple signal propagation paths between receiver and transmitter. ISI, as used herein, describes multipath interference arising from these multiple received symbols and can include interference arising from multipath signal delay spreads exceeding one symbol period.

In DSSS systems where the spreading code(s) do not allow multipath signals to be individually despread without interference, RAKE receiver techniques are not applicable. The basis of RAKE receiver operation assumes that each RAKE finger can cleanly despread a selected multipath signal, which is subsequently combined with the output from other RAKE fingers to form an overall RAKE receiver output signal. If the output from the individual RAKE fingers is corrupted by multipath interference, the combined signal will be compromised and RAKE receiver performance suffers.

Channel equalization offers a potential opportunity for improving receiver performance in a multipath channel. Unfortunately, conventional channel equalization techniques are not suitable for DSSS transmissions due to complexity. For any radio frequency channel, the term "channel-coherent bandwidth" describes the portion of a given channel's available bandwidth where a relatively flat frequency response may be observed. Typically, only a small portion of a wideband DSSS channel may exhibit a flat frequency response. Consequently, existing equalizers exploiting conventional filtering techniques are inappropriate for compensating a wideband DSSS channel for multipath interference. This inappropriateness results from the sheer complexity associated with implementing and training a conventional digital filter having a finite number of filter taps and corresponding filter coefficients that is capable of compensating the received signal for the complex frequency response of a wideband DSSS radio channel.

Existing approaches to DSSS receiver design do not adequately address multipath interference in systems where individual multipath signals cannot be despread relatively free of interference. As noted, these types of systems are typically based on less-than-ideal spreading codes, with IEEE 802.11b representing an example of such systems. Without the ability to handle multipath interference, such systems cannot reliably operate in environments with significant multipath interference. Existing approaches, including the use of RAKE receivers or conventional channel equalizers are either inappropriate or impractical.

Effective handling of multipath signals, whether for the purpose of interference compensation, such as in 802.11b environments, or for the purpose of coherent multipath signal combination, such as in RAKE receiver operations, depends upon developing accurate estimates of propagation path characteristics for one or more of the secondary propagation path signals included in the received signal. Under many real world conditions, the delay spread among the individual propagation path signals comprising a received multipath signal exceeds one symbol time, meaning that, at any one instant in time, the various propagation path signals may represent different information values (symbol values), making it potentially difficult to relate one propagation path signal to another. Without this ability, only multipath signals with propagation path delay spreads less than a symbol time may be processed substantially free from interference.

Thus, there remains a need for a method and supporting apparatus for identifying and characterizing secondary signal propagation paths relative to a main signal propagation path that accommodates a wide range of propagation path delay spreads, including delay spreads that exceed one symbol time. With the ability to determine time offsets between main and secondary signals over a range of less than to more than one symbol time, a communications receiver can accurately characterize secondary signal propagation paths relative to a main signal propagation path in variety of environments, even those with severe multipath conditions. Such a characterization method would allow for compensation of a received multipath signal in a broad range of radio signal propagation environments, even those with severe multipath conditions, thus enhancing communications receiver performance. This method and supporting apparatus would be particularly valuable in any type of DSSS communications system that relies on spreading techniques that do not intrinsically provide multipath interference rejection, but would also be valuable in any DSSS communications system subject to multipath signal reception.

SUMMARY OF THE INVENTION

The present invention provides a method of characterizing one or more secondary path signals relative to a main path signal, all such signals within a received multipath signal, thereby allowing a communications receiver or other like system to improve its reception performance in the presence of multipath signal reception. An exemplary embodiment of the method includes an initial course search that processes the received multipath signal to identify the strongest secondary signal or signals. With these signals identified, processing continues with comparing a magnitude of each of the identified secondary path signals with a magnitude of the main path signal to determine a more precise magnitude for the secondary path signals relative to the main path signal. This is followed by identifying corresponding symbols in said main and secondary path signals, which identifies any time shift in the secondary path signals relative to the main path signal. This is accomplished by identifying which symbols in a selected sequence of symbols received via the main path signal correspond which symbols in a sequence of symbols concurrently received via the secondary path signal. With time offsets relative to the main path signal identified for each secondary signal of interest, processing continues with determining phase shifts for each of the secondary signals relative to the main path signal. Thus, exemplary processing determines a phase shift, time offset, and magnitude for selected secondary signals relative to the main path signal. With this information, a communications receiver or like system can compensate the received multipath signal to improve reception performance.

In general, multipath signals comprise a strongest, main path signal, and remaining secondary path signals of varying lesser strengths (magnitudes). Each multipath signal has a potentially different magnitude, phase shift, and arrival time relative to the main path signal depending upon the characteristics of the particular signal propagation path through which it was received. Because each secondary path signal represents an altered version of the main path signal, secondary propagation path parameters may be determined based on comparing the secondary path signals relative to the main path signal. Thus, an information symbol or transmitted data item received through the main path signal may be considered to have an arrival time of $t_0$, a phase of 0, and a magnitude of 1. Secondary path signals may then be compared to the main path signal to determine relative magnitude, phase, and arrival time, thereby characterizing the secondary signal propagation path parameters with respect to the main signal propagation path.

The method of the present invention operates on DSSS multipath signals in exemplary embodiments. The training method assumes that a communications receiver or other like system may be made to synchronize with the data timing (symbol timing) of the main path signal. Further, the training method assumes that the exemplary communications receiver supports an adjustable despreading operation, wherein the received multipath DSSS signal may be despread with a desired PN sequence phase offset with respect to the main path symbol timing. Initially, the training method steps the despreading PN code phase offset through a full phase cycle with respect to the main path symbol timing at a desired resolution (phase step size). This action is referred to as a "course" search and identifies main and secondary signals, and their associated PN sequence phase offsets (offset indexes) based on observing the correlation strength exhibited by the despread signal for each PN sequence phase offset.

Preferably, only the strongest secondary signals are selected for characterization, but the training method of the present invention allows any number of secondary signals to be characterized. After selecting the secondary signals of interest based on the results of the course search, each selected secondary signal is processed in combination with the main signal to determine the secondary propagation path parameters. This processing includes developing an accurate relative magnitude based on comparing secondary signal magnitude with main signal magnitude. Preferably, a sequence of transmitted symbols is received concurrently via the main signal and a selected secondary signal. By comparing the accumulated or integrated magnitude values for the secondary and main signal sequence, an accurate value of relative magnitude for the secondary signal may be determined.

Subsequently, a sequence of main and secondary signal symbol phase values are differentially decoded and accumulated (or integrated). Differential decoding removes any constant phase shift induced in the symbol values received through the secondary path relative to the main path. Preferably, the main signal phase values are converted to nominal values before differential decoding, thus eliminating noise from subsequent comparison operations. Also preferably, the secondary signal phase values are differentially decoded before being converted to nominal phase values—this helps to avoid erroneously choosing a nominal phase value before the unknown secondary signal phase shift is removed. These main and secondary signal differentially decoded phase samples are cross-correlated with each other to determine to what degree (time wise) the selected secondary signal either leads or lags the main signal. By incorporating techniques that accommodate an essentially arbitrary range of delay spread—secondary signal arrival time with respect to the main signal arrival time—the training method accurately computes secondary path delays more or less than one symbol time away from the main path signal. These correlation operations identify the secondary signal path delay relative to the main signal.

Comparing leading, lagging, and current symbol phase samples, from both the main and secondary signal received symbol phase sequences determines a relative phase for the secondary signal. In fact, several possible relative phase values are determined using leading, lagging and current sample values. The previously determined secondary path time offset information determines the correct one of these possible phase values to use as the relative phase value. At this point, secondary propagation path parameters including relative magnitude, phase, and time offset are determined for a particular one of the selected secondary signals. The above processing may then be repeated for as many secondary signals as desired.

The relative magnitude and phase values may be combined to form a complex coefficient representing how the secondary signal is attenuated and phase shifted with respect to the main path signal. Thus, this complex coefficient may be applied to the main signal to produce an estimated secondary signal. These secondary signal estimates are useful in canceling one or more secondary signals from the received multipath signal. Indeed, in exemplary embodiments, the training method of the present invention provides a basis for multipath interference cancellation in wireless LAN systems based on IEEE 802.11b. In these applications, the training method of the present invention is used during the preamble and header portions of each 802.11b data packet to find the multipath signals, select the strongest (main) and next-strongest (secondary) multipath signals, and then characterize one or more of the secondary signals with respect to the main signal. This characterization information may then be used during the subsequent high data rate payload portion of the packet to provide cancellation of one or more of the secondary signals, thereby reducing interference in the main signal.

In other exemplary embodiments, the training method of the present invention may be used in DSSS communications systems to identify, select, and process main and secondary multipath signals for improvements in SNR, rather than for cancellation purposes. For example, a RAKE receiver may incorporate the training method of the present invention to identify and characterize the strongest multipath signals so that the individual RAKE fingers may be synchronized with a selected number of these strongest multipath signals. Then, the secondary path delay information developed in accordance with the training method supports the coherent combination operations performed by the RAKE receiver to gain improved SNR through multipath signal combining.

BRIEF DESCRIPTION OF DRAWINGS

FIG. 7C illustrates how an unknown secondary signal phase shift may be determined based on the operations shown in FIG. 7B.

DETAILED DESCRIPTION OF THE INVENTION

Figure 1:
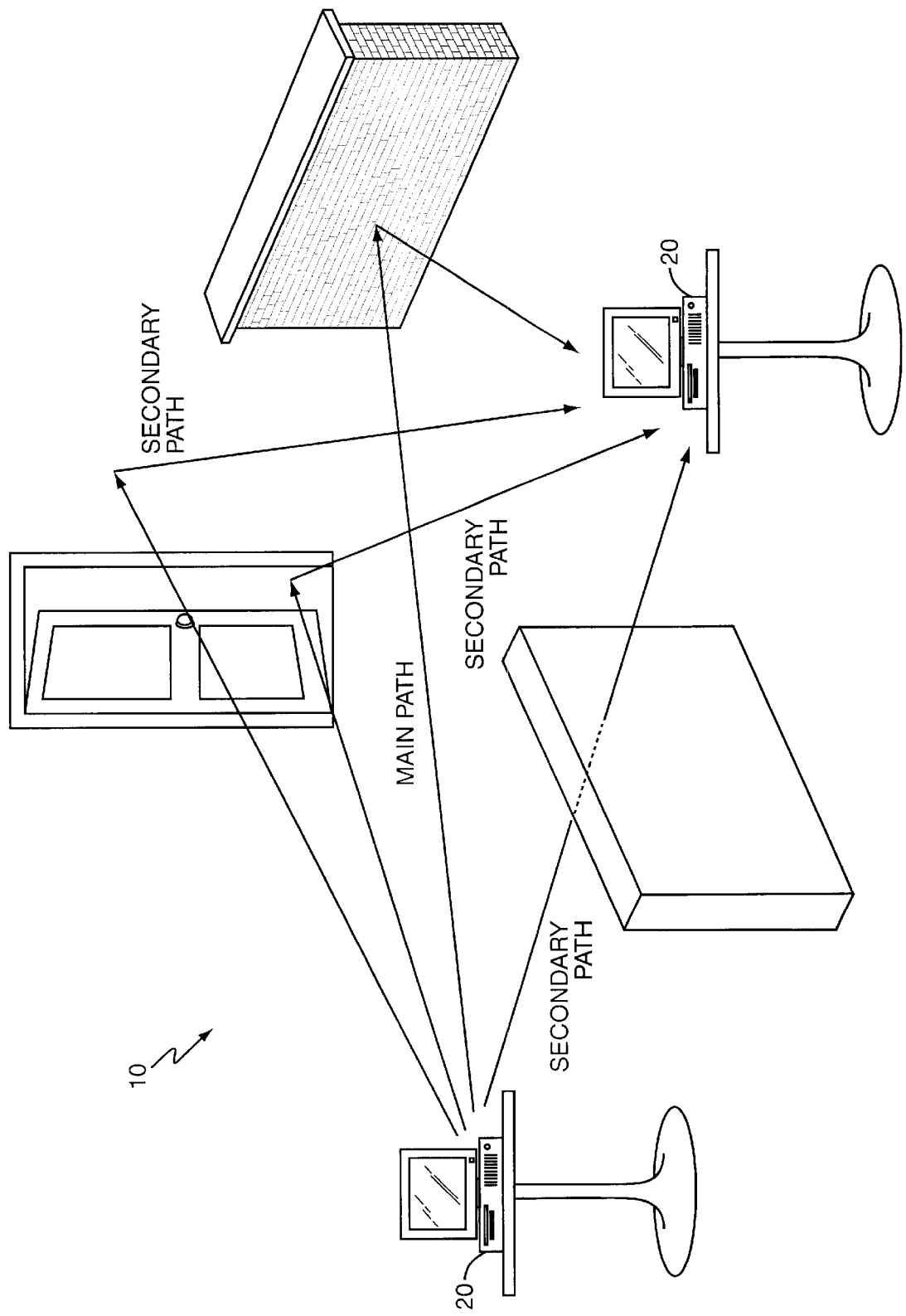
FIG. 1 illustrates a wireless communications environment subject to multipath signal reception.

FIG. 1 illustrates a wireless communications environment 10 subject to multipath interference. While FIG. 1 depicts two PCs 20 in wireless communications with each other, as might be expected in a wireless LAN environment, the present invention may be advantageously applied in any DSSS communications systems subject to multipath interference. As illustrated, multipath signals arise from intervening obstacles between a transmitter and a receiver—in this case, a transmitting PC 20 and a receiving PC 20. While not explicitly illustrated in FIG. 1, it will be readily appreciated that the multipath signals received by the receiving PC 20 may be subject to differing levels of attenuation and phase shifting based on the specific signal path followed by each signal. In the context of this disclosure, the main path signal is not necessarily the signal following the most direct route to the receiver; rather it is the strongest of the received multipath signals.

Figure 2A:
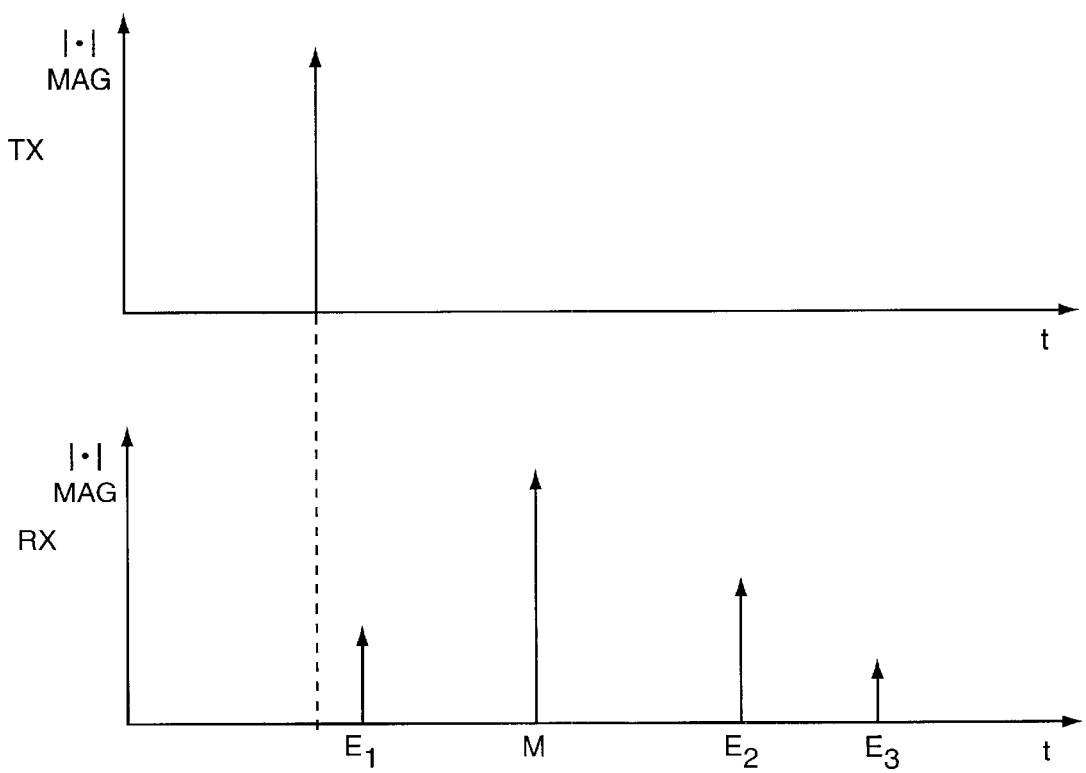
FIG. 2A illustrates the influence of multiple propagation paths on a received signal.

Because the multipath signals follow different signal paths of differing lengths, the various signals received by the receiver are subject to time dispersion. That is, the multipath signals are offset from one another by an amount of time proportionate to the difference in signal path length. FIG. 2A illustrates this time dispersion phenomenon. In FIG. 2A, the upper and lower horizontal time axes are aligned. An idealized impulse signal represents the transmitted data. Although the transmitter outputs a single clean impulse, the receiver actually receives multiple impulses at different times, with different amplitudes and phase due to multipath. The received signal with the largest amplitude is deemed the main path signal, denoted by "M" in FIG. 2A. The remaining, weaker signals are deemed echo or secondary multipath signals, and are denoted as $E_1 \ldots E_3$. Exemplary training method embodiments provide support characterization and subsequent cancellation for the two strongest secondary signals, while ignoring the weaker, remaining echo signals. In the context of FIG. 2A, the two strongest echo signals are $E_2$ and $E_1$. Note that the training method may be varied to characterize any number of secondary signals. Reception performance requirements and processing time limitations are considerations in choosing the number of secondary signals (echo signals) that will be characterized.

Figure 2B:
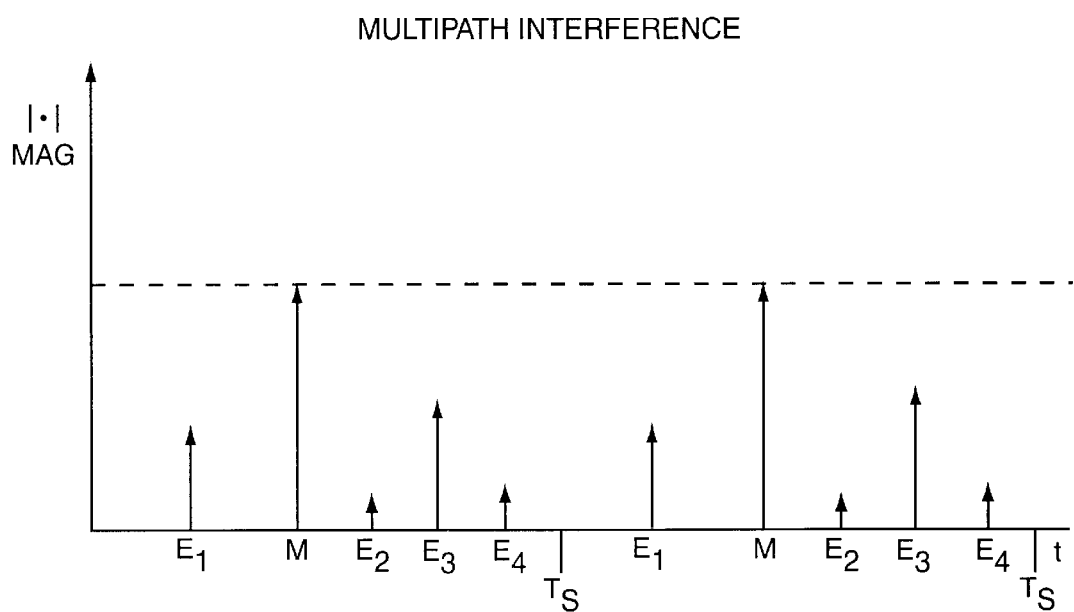
FIG. 2B illustrates the problem of inter-symbol interference in a sequence of received symbols.

In DSSS systems, information is transmitted from a transmitter to a receiver as a series of chips, with a defined number of chips forming a symbol. Each symbol corresponds to one or more known binary values. Thus, by decoding the received symbols, the receiver can re-create the binary data sent by the transmitter. Of course, to successfully decode these symbols, the receiver must synchronize with the transmitter's chip and symbol timing. FIG. 2B illustrates a sequence of received signals over at least two symbol times ($T_S$). What is not immediately apparent from FIG. 2B is whether one or more multipath events (echo signals) within a given symbol's time slot arises from the current symbol's transmission or from transmission of the previous symbol. Without the ability to make this determination, ISI cannot be effectively mitigated. The training method of the present invention provides a technique that includes identifying and characterizing multipath events with time offsets that may exceed one or more symbol times and, thus, provides methods for identifying and compensating for ISI.

Figure 3:
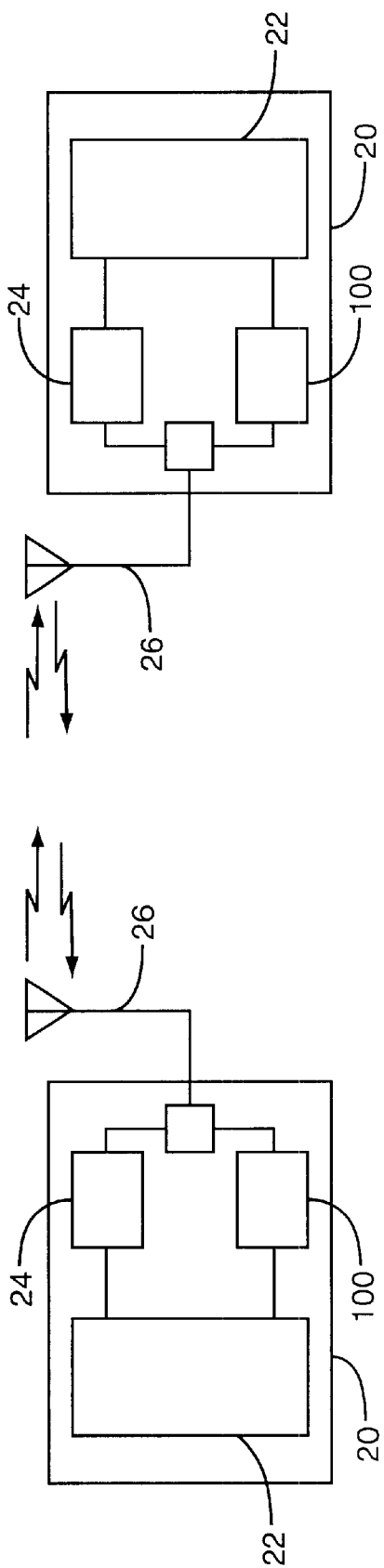
FIG. 3 illustrates an exemplary wireless networking system in which the present invention may be advantageously practiced.

FIG. 3 depicts an exemplary PC-based wireless LAN environment in which the various aspects of the present invention may be advantageously practiced. PCs 20 communicate with one another via wireless signaling, transmitting and receiving signals through antennae 26. Each PC 20 includes an exemplary communications receiver 100 supporting the training method and associated operations of the present invention, a compatible transmitter 24, and supporting circuitry 22. FIG. 3 is not meant as a depiction of actual structure for the inter-organization of PC 20; rather, FIG. 3 provides a functional depiction for the inclusion of the communications receiver 100 of the present invention within a typical wireless LAN environment. The PCs 20 send and receive information via transmitters 24 and communications receivers 100, respectively. Such communications may be peer-to-peer (between PCs), or may be routed through a hub or server equipped with a wireless interface. The actual network organization and hierarchical structure used in a given application is not important with respect to understanding the present invention.

Ideally, the communications receiver 100 is implemented as single integrated circuit, including portions supporting programmed operation, but may be implemented as a cooperative collection of integrated circuit devices collectively supporting the same functionality. Exemplary embodiments of the communications receiver 100 support the training method of the present invention and the channel equalization (multipath interference cancellation) methods detailed herein.

Figure 4:
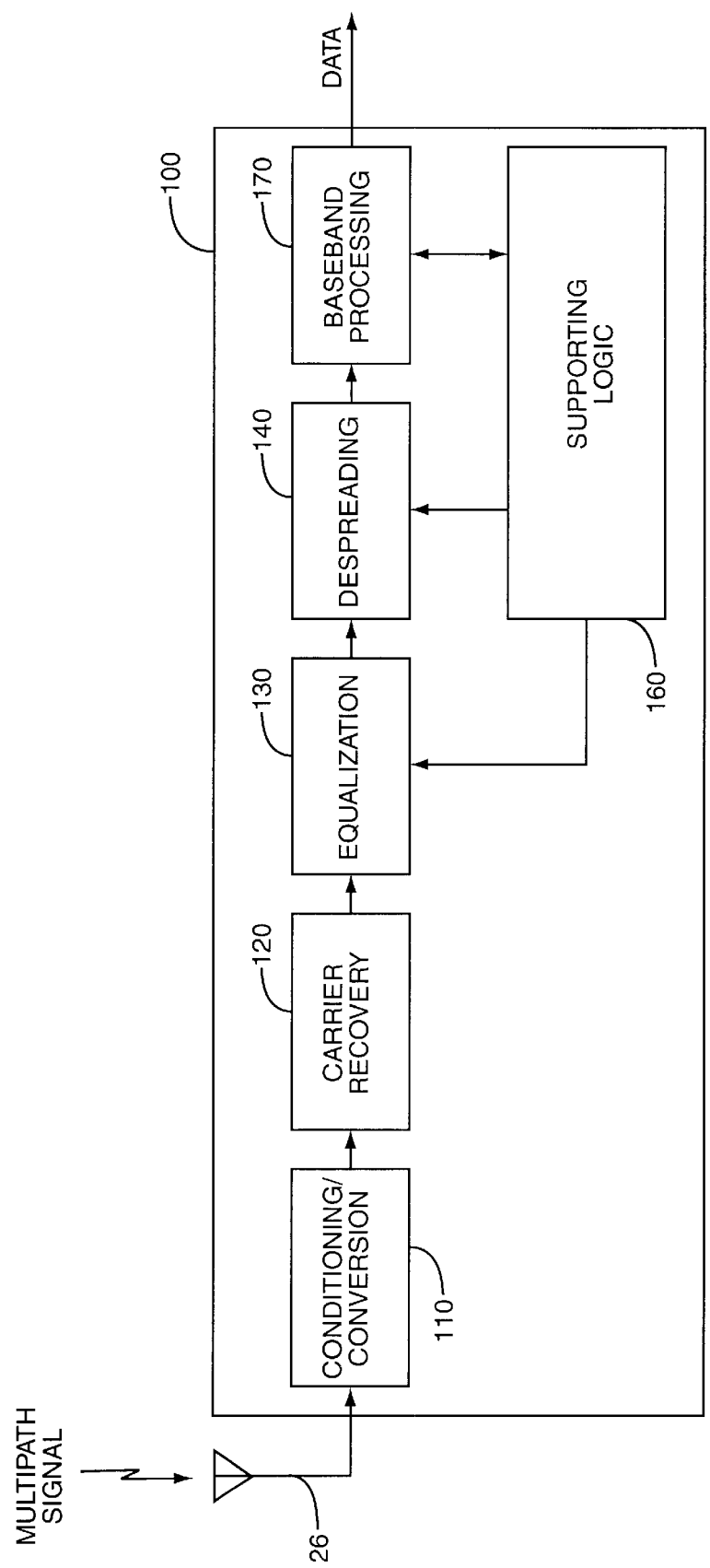
FIG. 4 is a generalized block diagram of an exemplary communications receiver used in the system of FIG. 3.

FIG. 4 provides a more detailed illustration of the communications receiver 100 introduced in FIG. 3. The communications receiver 100 includes a conditioning and conversion circuit 110, a carrier recovery circuit 120, an equalizer 130, a despreading circuit 140, a baseband processing circuit 170 including a training circuit 200 (shown in FIG. 5), and additional supporting logic 160.

Signals received through antenna 26 pass through the conditioning and conversion circuit 110, where they are filtered, optionally amplified, and converted from analog to digital format. Digital information then passes to the carrier recovery circuit 120. The carrier recovery circuit 120 maps received symbols in the main path signal to one of the ideal constellation points defined by the transmit signal modulation scheme. For example, QPSK-modulated symbols map to one of the 4 defined constellation points, namely +/−1 and +/−j. Output from the carrier recovery circuit 120 passes to the equalizer 130 that is preferably included in the communications receiver 100.

In order for the equalizer 130 to effectively cancel selected multipath interference from the received multipath signal, the communications receiver 100 must properly configure the equalizer 130 based on performing training method of the present invention. This configuration entails providing the equalizer 130 with a complex coefficient and corresponding delay information for each secondary path to be canceled from the received signal. The complex path coefficient represents a learned model of propagation path parameters for a given secondary path, while the delay information represents the arrival delay of the given secondary path relative to the main path signal arrival time. The training circuit 200, shown within baseband processor 170 (FIG. 5), and discussed in detail later, represents an exemplary circuit for practicing the training method of the present invention. Of course, other circuit implementations may provide similar functionality and can be used to practice exemplary embodiments of the training method of the present invention.

Once configured, the equalizer 130 compensates the main path signal for multipath interference caused by the secondary signals. The compensated output from the equalizer 130 then passes to the despreading circuit 140, where signal correlation operations provide the baseband processor 170 with despread, received signal samples. Baseband processor 170 extracts the received data from these received signal samples.

Figure 5:
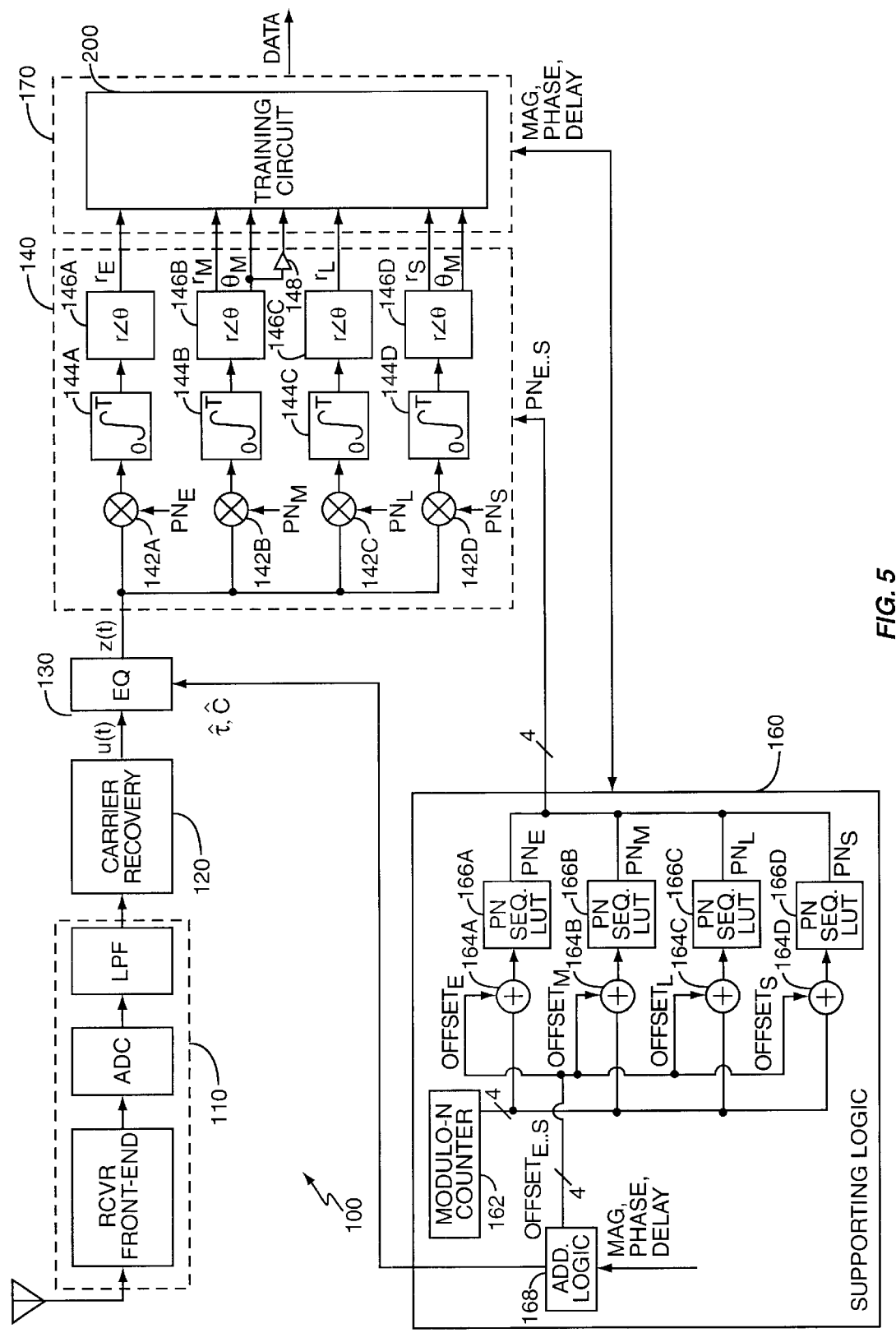
FIG. 5 is a more detailed functional block diagram of the communications receiver of FIG. 4.

FIG. 5 provides more details of the exemplary communications receiver 100 shown in FIG. 4. The conditioning/conversion block 110 includes a receiver front-end circuit, analog-to-digital converter, and a digital low-pass filter. The despreading circuit 140 includes four sets of despreading circuits, including a "main path" despreading circuit that includes a multiplier 142B, an integrator 144B, a coordinate translator 146B, and a phase slicer 148. Additional multipliers 142A and 142C in combination with integrators 144A and 144C and coordinate translators 146A and 146C, comprise "early" and "late" despreading circuits, respectively. Multiplier 142D, integrator 144D, and coordinate translator 146D combine to form a "secondary path" despreading circuit. The supporting logic circuit 160 includes a modulo-N counter 162, a set of offset adders 164A . . . D and a corresponding set of PN sequence look-up tables (LUTs) 166A . . . D. The supporting logic 160 also includes additional logic resources 168. A baseband processor 170 includes a training circuit 200 that is used to determine the secondary path propagation parameters that permit the equalizer 130 to cancel multipath interference in the received signal.

Generally, the received signal coming into the conditioning/conversion circuit 110 comprises both in-phase (I) and quadrature (Q) signals. These signals may be filtered and/or buffered in a front-end circuit before being converted from analog format into digitized I and Q sample streams by analog-to-digital converters. Subsequent to digital conversion, the I and Q samples may be low-pass filtered before leaving the conditioning/conversion circuit 110. The carrier recovery circuit 120 corrects for carrier frequency error, as previously described, and passes the digitized samples on to the equalizer 130. As will be discussed in more detail later, the equalizer 130 compensates the received signal samples for multipath interference once it has been properly configured.

As noted, the training circuit 200 represents an exemplary circuit for practicing the training method of the present invention. In learning secondary path parameters, the training circuit 200 operates on the main path received signal and selected secondary path signals. Thus, the despreading circuit 140 is required to provide the training circuit 200 with one despread signal that is synchronized with the phase of the main path signal and one despread signal that is synchronized to the phase of a selected secondary path signal. These input signals represent successive sample values of magnitude and phase for the main path and selected secondary path signal. Therefore, while not critical to practicing the present invention, an understanding of the exemplary despreading circuit 140 illustrated in FIG. 5 is helpful in understanding how the secondary path propagation parameters are learned using training circuit 200. Note that the training for the present invention may be practiced with any type of circuit or system capable of providing magnitude and phase information for the main path and secondary path signals.

As explained earlier, DSSS receivers despread received signals using the same PN sequence that was used by a corresponding transmitter to spread the original narrowband information signal. For maximum correlation, the receiver's progression through the PN sequence must be exactly synchronized with the transmitter's PN sequence progression. That is, the instantaneous PN sequence value at the receiver must exactly match that of the transmitter for maximum correlation response. The modulo-N counter 162—which is a Modulo-44 counter in exemplary embodiments—included in supporting logic 160 provides a repeating count sequence used to sequentially select values from memory-based PN sequence look-up-tables (LUTs) 166A . . . 166D. The output PN sequences ($PN_E$, $PN_M$, $PN_L$, and $PN_S$) provided to the despreading circuit 140 are all based on a commonly selected PN sequence, but may have differing sequence offsets based on their respective index offset values ($OFFSET_E$, $OFFSET_M$, $OFFSET_L$, and $OFFSET_S$) signals feeding the offset multipliers 164A . . . 164D.

With the above information in mind, the set of four multipliers (correlators) 142A . . . 142D in the despreading circuit 140 are capable of despreading the received signal with up to four different despreading phases. In operation, the communications receiver 100 configures the supporting logic 160 such that $OFFSET_M$ sets the sequence offset of the "on-time" or main path sequence ($PN_M$) supplied to the multiplier 142B such that it is synchronized with the main path signal. This allows the despreading circuit 140 to provide the training circuit 200 with magnitude samples $r_M$ and phase samples $\theta_M$ corresponding to the main path signal. The communications receiver 100 adjusts the PN sequence offsets of $PN_E$, and $PN_L$ ($OFFSET_E$ and $OFFSET_L$) such that multipliers 142A and 142C despread the received signal with PN sequences adjusted to have a phase slightly earlier and slightly later than the main path PN sequence phase, respectively. However, these operations relate to maintaining synchronization with the main path signal, rather than to practicing the present invention and are not further detailed herein.

In estimating secondary propagation path parameters for each of the secondary path signal of interest, the $OFFSET_S$ value is adjusted to synchronize the secondary path despreading circuitry in the despreading circuit 140 with selected ones of the secondary propagation path signals. This allows the communications receiver 100 to control the despreading circuit 140 to provide the training circuit 200 with magnitude and phase samples of the received signal synchronized, at different times during training, to each one of the secondary path signals for which cancellation is desired.

Figure 6:
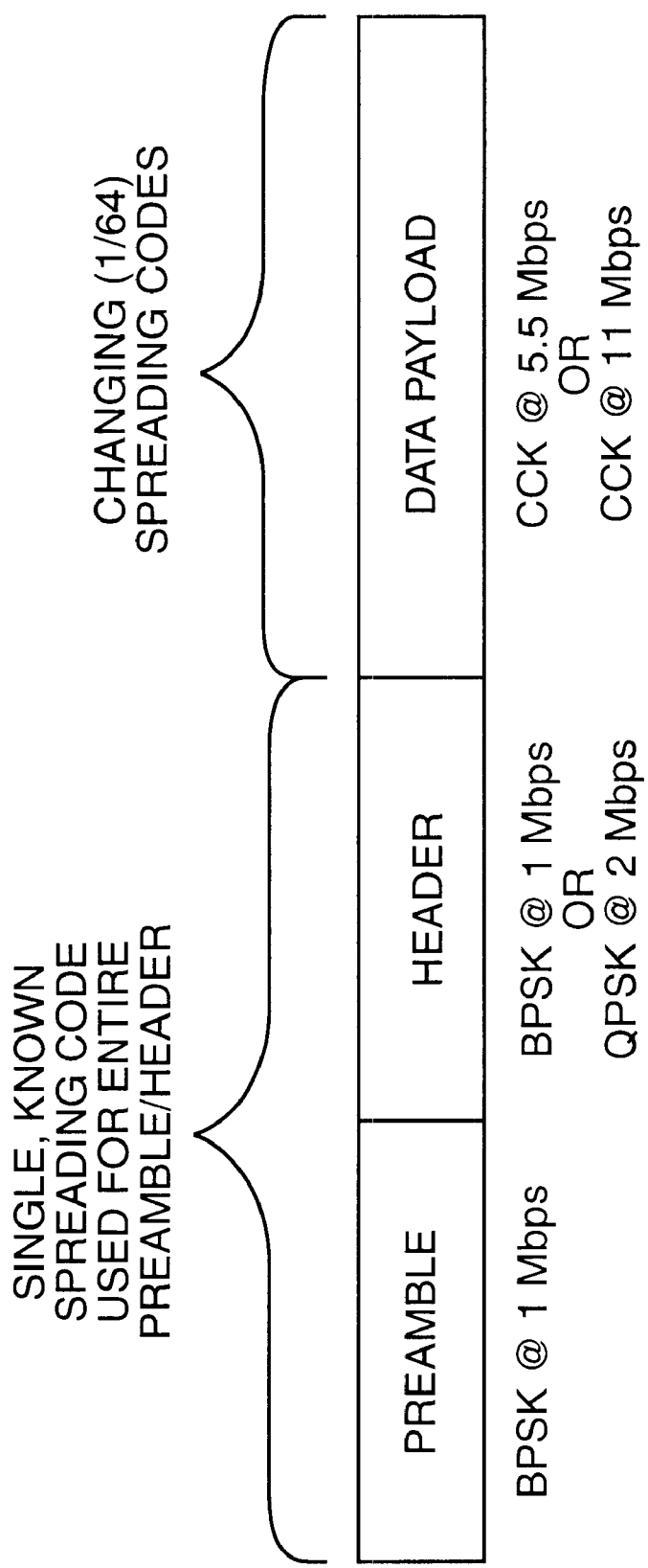
FIG. 6 illustrates the structure of an IEEE 802.11b wireless LAN data packet.

In 802.11b applications, the communications receiver 100 uses the training method of the present invention and associated circuitry (e.g., the training circuit 200 and equalizer 130 ) to provide multipath interference cancellation in CCK-modulated received signals conforming to IEEE 802.11b standards. Understanding the structure of an 802.11b data packet is helpful in understanding exemplary training and cancellation operations. FIG. 6 illustrates the structure of an 802.11b data packet. 802.11b data packets comprise a preamble, a header, and a data payload. In standard 802.11 data packets, the preamble is transmitted at 1 Mbps using BPSK, while the header and payload may be transmitted at either 1 Mbps or 2 Mbps. At 2 Mbps, QPSK is used rather than BPSK. In 802.11b , modulation of the header and preamble remain the same, but the data payload is transmitted at 5.5 Mbps or 11 Mbps, with CCK modulation used in both cases.

In general, channel estimation may be supervised (both transmitted data and spreading code are known), blind (both transmitting data and spreading code are unknown), or semi-blind (spreading code is known but data is unknown). As one might guess, blind estimation represents the most difficult approach, while supervised estimation is the most straightforward. For 802.11b applications, the present invention adopts semi-blind training techniques (based on the known spreading code applied to 802.11b preambles and headers) to develop appropriate coefficients for the equalizer 130.

The fixed spreading sequence applied to the preamble and header has good correlation properties that allow conventional 802.11 receivers to despread one or more multipath signals arising from the transmission of the preamble and header without substantial interference from the other multipath signals, regardless of whether 802.11 or 802.11b is being used. This means that multipath cancellation (channel equalization) is typically not required during reception of the preamble and header portion of an 802.11b data packet. This allows the communications receiver 100 to characterize the secondary propagation paths' influence on the transmitted signal during the 802.11b preamble and header. This information is then used to provide channel equalization during the CCK-modulated 802.11b payload, where multipath signal cancellation becomes necessary to avoid interference. In other words, the communications receiver 100 uses the training method of the present invention during the preamble and header portion of each 802.11b data packet, taking advantage of the good correlation properties of the known spreading code applied to the preamble and header, to learn the multipath channel conditions prevailing for the current 802.11b data packet.

As applied in 802.11b systems, training is such that path parameters for the major secondary path signals can be learned based on processing a relatively small number of received symbols-fewer than are contained in the standardized preamble and header. This allows the communications receiver 100 to determine the required path parameters and configure and then enable the equalizer 130 for active cancellation before the start of the high data rate 802.11b payload portion of the data packet. The information provided to equalizer 130 for secondary signal cancellation is derived and updated during training, and then held fixed during the 802.11b packet payload. In short, the equalizer 130 is disabled during the preamble and header (while training is active) and then updated and enabled prior to the payload, and this action is repeated for each successive 802.11b data packet.

In communications systems, equalizers function essentially as filters that are tuned to the response of the radio channel. In a preferred system, the equalizer 130 produces estimates of the significant multipath reflections (secondary signals) of the main path signal based on learned propagation characteristics (magnitude, phase, and delay) for the secondary propagation paths associated with the radio channel. These reflection estimates are subtracted from the received signal, thereby providing cancellation of selected multipath signals included in received signal. The training method detailed herein provides an advantageous technique for developing these secondary propagation path characteristics.

Ideally, a radio channel has a flat frequency response, meaning that it passes all frequencies of interest with uniform attenuation and phase shift. In reality, radio channels seldom exhibit this ideal behavior. Before training, equalizer 130 is simply turned off—or, equivalently, set to a flat frequency response. After synchronizing the main path circuitry (carrier recovery circuit 120 and the main path despreading correlator included in despreading circuitry 140) with the main path signal, the communications receiver 100 individually synchronizes its secondary path circuitry (including the secondary path correlator of the despreading circuitry 140) with the secondary path signals in the accommodated delay spread range, extending both before and after the arrival of the main path signal, to determine the strongest secondary path signals. Preferably, the communications receiver 100 incorporates circuit resources supporting the operation introduced in FIGS. 7A through 7C, and more greatly detailed in FIG. 8.

Figure 7A:
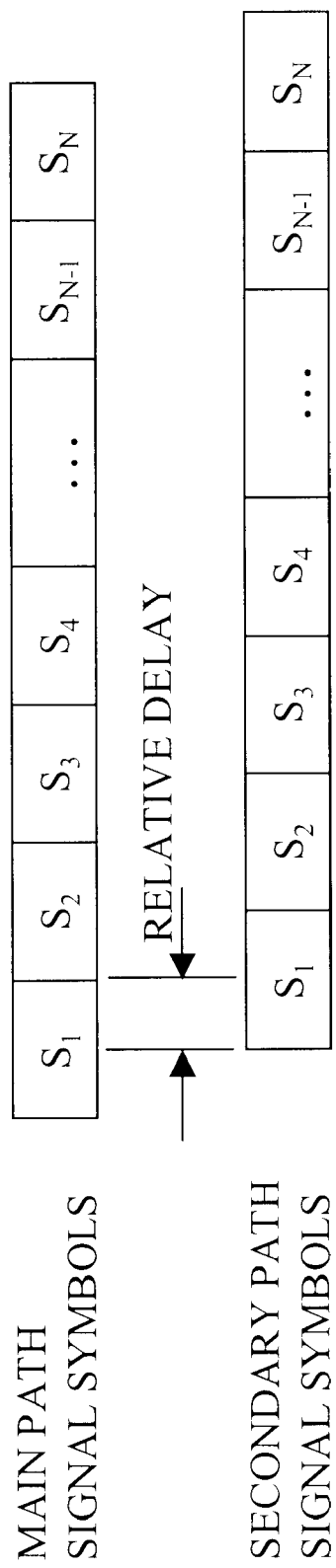
FIG. 7A depicts time-offset main and secondary path received signal symbol sequences.

FIG. 7A depicts a sequence of symbols ($S_1 \ldots S_N$) arriving at the communications receiver 100 via a main signal propagation path and a secondary signal propagation path. Each symbol block represents one symbol time or period, and the sequence of symbols received through the secondary path has an unknown delay relative to the sequence of symbols received via the main path. Secondary path delays may be less or more than one symbol period. In an actual multipath signal, some secondary signals will likely have delays falling within one symbol time of a given main path received symbol, while other secondary signals will have delays falling outside one symbol time.

Figure 7B:
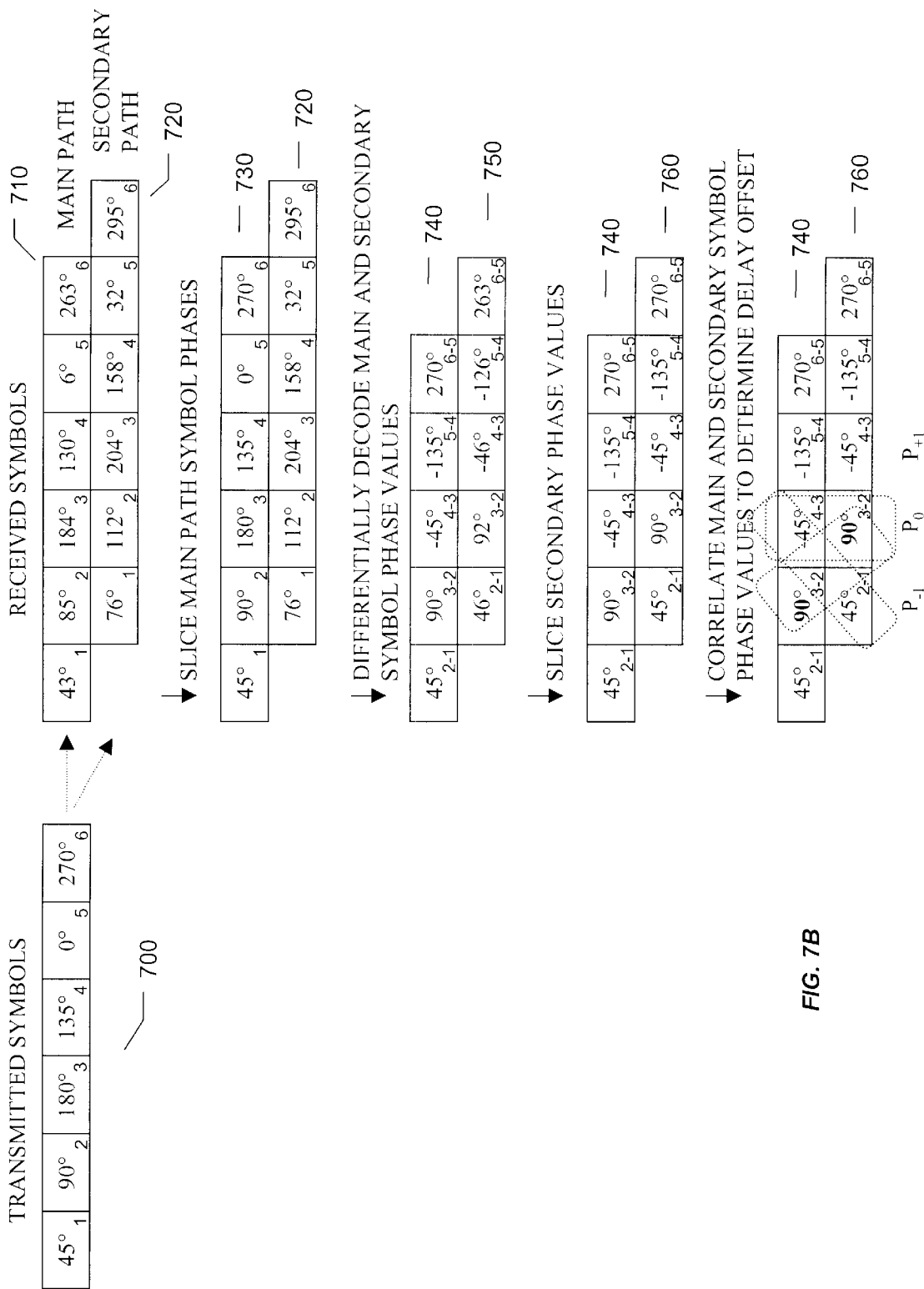
FIG. 7B provides exemplary details for a portion of the main and secondary path signal processing operations associated with the training method of the present invention.

FIG. 7B generally outlines training for a given secondary signal. In PSK transmission, symbols are conveyed using phase modulation. Thus, the numbers within the blocks comprising sequence 700 represents an exemplary sequence of ideally transmitted symbols (phase values). Note that these phase values are for illustration and may not correspond to phase values used in any actual PSK modulation scheme. The transmitted sequence 700 is received by the communications receiver 100 through a main signal path as a main sequence 710, and through a secondary signal path as a secondary sequence 720. For convenience, the secondary sequence 720 is illustrated offset from the main sequence 710 by one symbol period, but may take on any offset value in practice.

As received, the sequences 710 and 720 do not perfectly reflect the symbol phase values in transmitted sequence 700. While the main path symbols in sequence 710 are relatively close to the transmitted values in sequence 700, they exhibit some noise-induced differences. The secondary path symbols exhibit noise problems as well, but further exhibit a phase shift with respect to the main path symbols. As an example, sequence 720 is illustrated with a phase shift of approximately 30° with respect to sequence 710. So, for example, a transmitted symbol phase of 45° becomes 43° through the main path—due to noise—and, relative to the main path, becomes 76° through the secondary path—due to noise plus secondary path phase shift. For a given secondary signal path, this phase shift is essentially constant unless signal transmission conditions change.

To determine the correspondence and, hence, the time offset between the main and secondary signal, the main path symbol phase values are first sliced or adjusted to their corresponding nominal phase values to form sequence 730, while the secondary path values are not modified. This removes phase noise from the individual main path samples. Since the phase values in the received secondary sequence 720 have an unknown phase shift compared to the values in the received main path sequence 710, they are not yet sliced. To remove this unknown phase shift, the secondary sequence 720 is differentially decoded to form the differential secondary sequence 750, and the sliced main sequence 730 is, for consistency, also differentially decoded to form the sliced, differential sequence 740. Once the unknown offset is removed, sequence 750 may be sliced to remove individual sample phase noise to form the differential, sliced secondary sequence 760.

At this point, individual phase sample values in sequence 740 may be compared with phase samples in sequence 760 to identify which phase sample in the secondary sequence 760 corresponds with which phase sample in the main sequence 740. As illustrated, corresponding values are shown in bold. Based on identifying this correspondence, training may then determine the path delay and phase shift for the secondary signal being processed. As shown, current main sequence values are compared to current and preceding secondary sequence values, and current secondary sequence values are compared with preceding main sequence values. As shown, these correlation operations are limited to adjacent symbols, but may be extended across additional symbols.

Once main and secondary path symbol correspondence is determined, as explained above, the unknown phase shift of the secondary path relative to the main path may be determined. Here, differential decoding is not used, so that the secondary path phase shift is preserved. Operating on sliced received main path symbol phase values and un-sliced secondary path symbol phase values (sequences 730 and 720, respectively, in FIG. 7B), the training method subtracts a preceding secondary phase value from a current main phase value, a current secondary phase value from the current main phase value, and the current secondary phase value from a preceding main phase value. Only one of these differences represents the actual phase shift of the secondary signal relative to the main signal. In the example outlined in FIG. 7B, the current secondary phase value corresponds with the preceding main phase value. FIG. 7C illustrates that the difference between the preceding main phase value and the current secondary phase values represents an estimate of the actual secondary-to-main phase shift. Of course, the range of main and secondary symbols used in the operations outlined in FIGS. 7B and 7C may be varied as needed to cover a broader range of delays.

Figure 8:
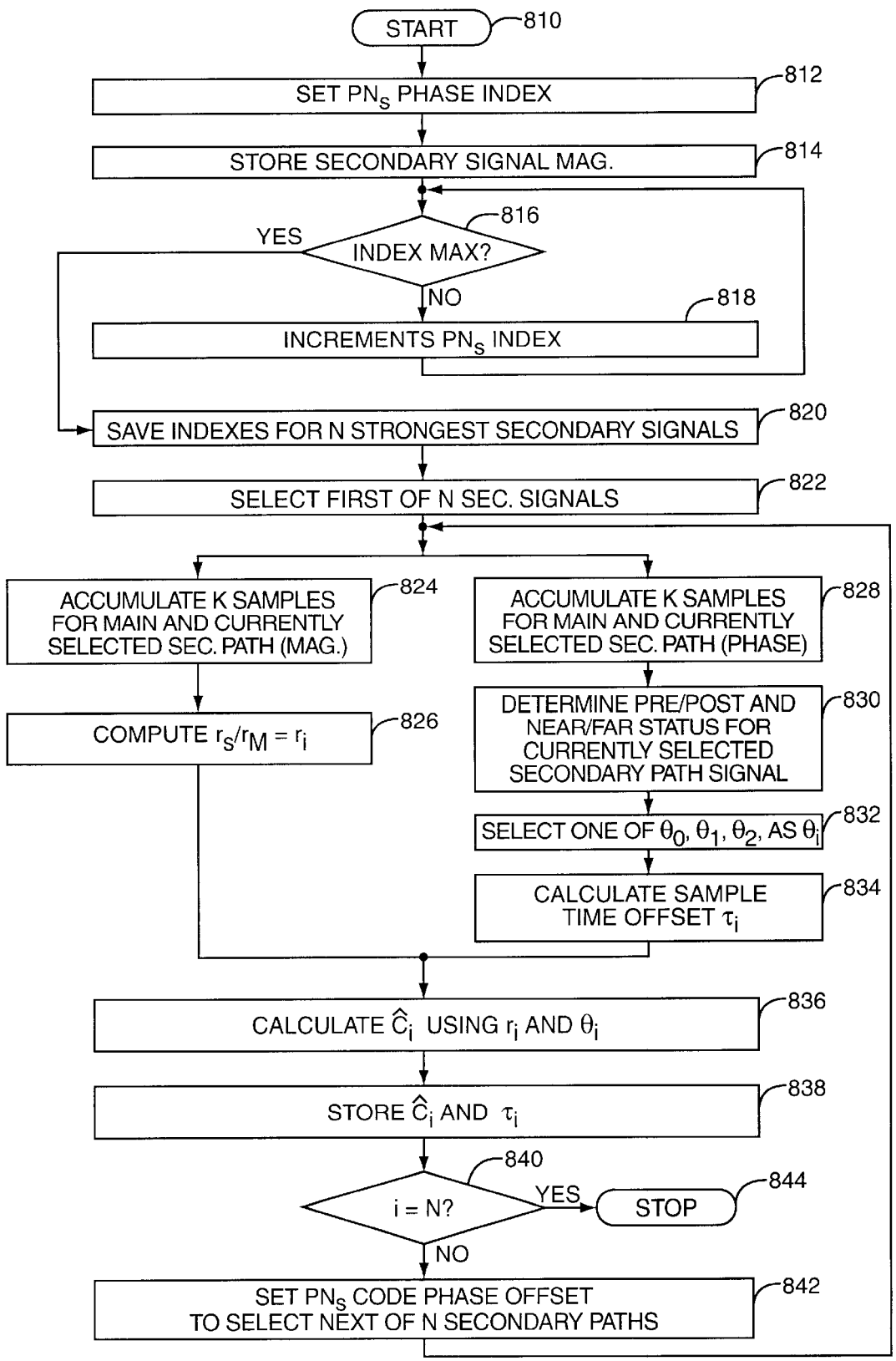
FIG. 8 is a simplified logic flow diagram for an exemplary embodiment of the training method of the present invention.

FIG. 8 broadly presents an exemplary embodiment of the training method. The general process includes identifying the main propagation path signal and major (strongest) secondary propagation path signals, and learning propagation path characteristics for the secondary signals of interest, relative to the main propagation path signal. In the context of the communications receiver 100, this assumes the carrier recovery circuit 120 and despreading circuits 140 have performed initial synchronization with transmitted symbols received via the main path signal and continue tracking the main path signal during operation. Synchronization and tracking may be accomplished in a number of ways, and the specifics of how these are accomplished are not critical to understanding the training process. In this sense, however, FIG. 8 may be a simplification of the overall operating logic implemented in the communications receiver 100. Indeed, the communications receiver 100 may execute the logic outlined in FIG. 8 in the context of larger, more complex operating algorithms, and may represent operating logic executed concurrently with other operations.

Processing begins (block 810) with the assumption that a received signal sample stream synchronized with the main propagation path symbol timing and phase is available, this is referred to as the main path signal. Further, a received signal sample stream that may be selectively synchronized with individual secondary propagation path signals is also assumed available, and this is referred to as the secondary path signal. In exemplary embodiments, the secondary path signal is adjusted to "scan" over an entire spreading code phase range to identify secondary path signals—this process may be thought of as a "course" search. This may be done at various resolutions, with an exemplary embodiment adopting a secondary path phase step equal to ½ chip resolution. Thus, in exemplary embodiments, circuitry supporting the despreading of secondary path signals is adjusted to an initial PN code phase offset index (block 812).

The secondary path signal magnitude and PN code phase offset index, for this initial setting are stored (block 814), and the PN code phase offset index is checked to insure that the code phase offset adjustment has not reached a maximum offset index value (block 816). The PN code phase offset is then adjusted such that secondary path despreading circuitry adopts the next PN code phase offset setting (block 818) and the secondary signal magnitude and PN code phase offset are stored for this phase setting. Blocks 814 to 818 are repeated for each PN code phase offset setting, until the maximum code phase offset setting is reached (block 816), at which point processing advances to a point where the N strongest secondary path signals are identified, where the strongest multipath signal is the main path signal (block 820).

At this point, a set of multipath signal magnitudes exists, one for each corresponding phase offset index in the despreading PN sequence. These magnitude values correspond to individual signals contained in the received multipath signal, with each one representing the multipath signal being despread with a different phase index offset setting. In exemplary embodiments, the magnitude values are evaluated to identify the magnitude samples having the greatest and next-greatest magnitudes. The greatest magnitude value corresponds to the strongest of the multipath signals in the received multipath signal, deemed the main path signal, while the next-greatest magnitudes correspond to the significant secondary signals in the received multipath signal.

In exemplary embodiments, only the two strongest secondary path signals are characterized for cancellation (e.g., N=2), as these two secondary signals represent the main source of multipath interference in the received signal. Other embodiments may provide cancellation for fewer or greater numbers of secondary (echo) signals. Essentially any number of secondary path signals may be selected and subsequently characterized with this method, but characterizing and canceling very weak secondary signals may provide little additional benefit.

With the N secondary path signals of interest identified, processing advances to the characterization portion of the method of the present invention. In exemplary embodiments of this method adapted to provide multipath interference cancellation in 802.11b data packets, propagation path parameters for the selected secondary path signals are learned at the beginning (preamble/header) of each 802.11b data packet, and are characterized with respect to the main propagation path signal. The main propagation path signal may be considered to have a magnitude of 1, and a phase of 0. Thus, learning the parameters of the selected secondary path signals entails determining a complex coefficient that expresses the relative magnitude and phase of a given secondary path signal with respect to the normalized main path signal.

Parameterization of the secondary path signals additionally entails identifying the propagation path delay of each selected secondary path with respect to the main propagation path. Based on the previously saved phase offset index value corresponding to the first secondary path of interest, the secondary path despreading circuit is synchronized with the first of the secondary path signals of interest (block 822). Received signal magnitude and phase samples for both the main path signal and the selected secondary path signal are accumulated over K symbols (blocks 824 and 828 respectively). While simultaneous acquisition of magnitude and phase sample information is depicted, some embodiments may employ non-simultaneous magnitude and phase processing.

With respect to magnitude, the accumulated samples are integrated to form $r_S$ and $r_M$, representing the secondary path signal magnitude integrated over M symbols and the main path signal magnitude integrated over the same M symbols, respectively. Using these values, the relative magnitude of the currently selected secondary path signal may be computed with respect to the main path signal, providing the value $r_i$ (block 826), which is stored for subsequent use.

Based on correlating differentially decoded phase values from previous, current, and succeeding main path and secondary path symbols, the method of the present invention identifies whether the current secondary path symbol arises from the current main path symbol, or if it is associated with a different main path symbol (block 830). With this information, the appropriate phase of the currently selected secondary path signal may be determined with respect to the main path signal (block 832), and the delay offset of the currently selected secondary propagation path may be determined with respect to the main path signal (block 834).

Thus, for the currently selected secondary path signal, the relative magnitude $r_i$, the relative phase $\theta_i$, and the path delay $\hat{\tau}_i$ are now estimated. The magnitude and phase information are combined to form a complex coefficient $\hat{C}_i$ that represents the magnitude and phase changes experienced by a signal transmitted via the currently selected secondary propagation path with respect to the main propagation path transmission (block 836). Exemplary embodiments of the method of the present invention assume that the radio channel propagation path characteristics are constant over the duration of a single 802.11b data packet. Thus, this complex coefficient may be used in the cancellation of the currently selected secondary path signal in the payload portion of the current 802.11b data packet, and then updated at beginning of the next data packet. Of course, in other embodiments, the method of the present invention may be readily adapted to complement the requirements of other protocols or system configurations.

The learned parameters ($\hat{C}_i, \hat{\tau}_i$) for the currently selected secondary path signal are stored for subsequent use in other system operations (block 838). In an exemplary implementation, the communications receiver 100 provides these learned parameters to the equalizer 130 for use in its multipath interference cancellation operations, but this represents only one of many possible uses. For example, in other types of systems, such as previously discussed CDMA cellular telephone systems, the learned secondary path channel parameters may be advantageously used by a RAKE receiver to synchronize one of its RAKE fingers with the currently selected secondary path. The secondary path parameters further provide path delay information necessary to coherently combine individual RAKE fingers signals to form the RAKE receiver output.

Once the currently selected secondary path signal has been fully characterized, processing checks if there are any remaining secondary path signals of interest (block 840). If there are not, processing ends (block 844), otherwise the secondary path despreading circuitry is adjusted to synchronize with the next secondary path signal of interest (block 842), so that its path parameters may be similarly learned (blocks 824 through 838).

Figure 9:
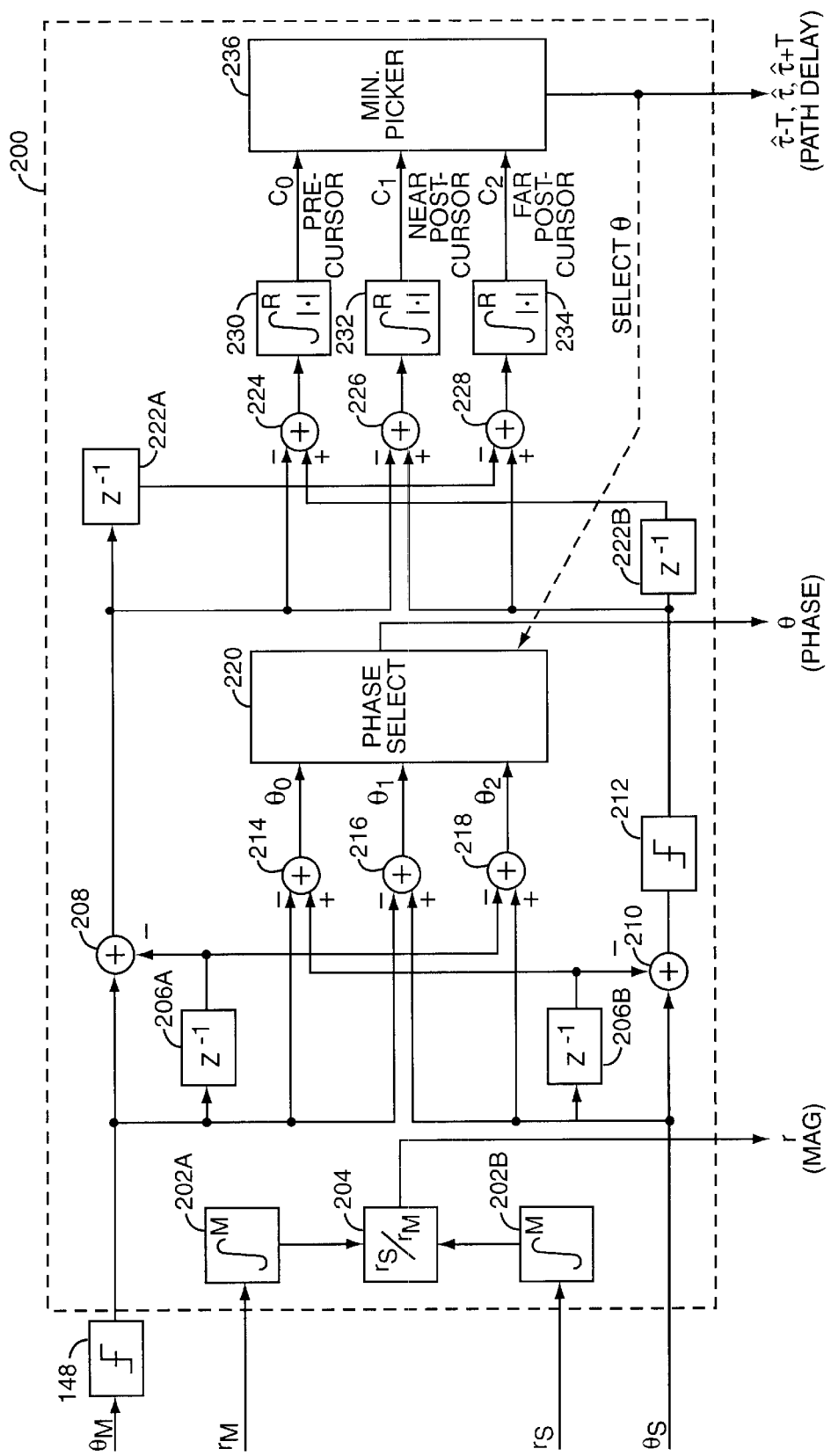
FIG. 9 is a simplified block diagram of an exemplary embodiment of a training circuit for practicing the training method of the present invention.

The training circuit 200—introduced in FIG. 5—represents an advantageous circuit for practicing exemplary embodiments of the training method of the present invention. FIG. 9 provides more detail for an exemplary embodiment of the training circuit 200. As noted, the circuits comprising the training circuit 200 preferably are integrated with the communications receiver 100. In operation, the training circuit 200 receives a main path signal that remains synchronized to the strongest of the multipath signals, and a secondary path signal that is synchronized at different times with different ones of the secondary path signals. For reference in the subsequent discussion, variables associated with the main path signal will have an "M" subscript, while variables associated with the secondary path signals will have an "S" subscript.

The communications receiver 100 adjusts the offset index (OFFSET$_M$) of the PN$_M$ sequence using adder 164B, which changes the code phase of the PN sequence provided to multiplier 142B, allowing it to synchronize with and despread the main path signal. Thus, $r_M$ and $\theta_M$ represent magnitude and phase sample values, respectively, of the main path signal. Secondary propagation path parameter estimation requires the communications receiver 100 to characterize a select number of secondary path signals with respect to the main path signal. The number of secondary path signals that are characterized during training depends upon specific design and operating requirements. Those skilled in the art will readily appreciate that the training method of the present invention may be varied in this and in other respects without departing from the scope of the present invention. Exemplary embodiments process the secondary path signals to identify the two strongest secondary path signals, with these strongest signals referred to as the secondary path signals of interest.

The communications receiver 100 varies the offset index (OFFSET$_S$) of the secondary path PN sequence (PN$_S$) using adder 164D, which changes the code phase of the PN sequence provided to the secondary signal despreading circuitry (including multiplier 142D) in the despreading circuit 140. This allows the despreading circuit 140 to selectively synchronize with each secondary signal. Each offset change in the PN$_S$ sequence supplied to the despreading circuit 140 effectively results in despreading the received signal with a different time delay relative to the main path signal timing. Essentially, the communications receiver 100 sets the offset of the PN$_S$ sequence and monitors the magnitude of $r_S$. In exemplary embodiments, it performs this operation at half-chip resolution over an entire PN code phase cycle relative to the main path symbol timing. By recording the phase settings (index offsets) that result in the greatest magnitudes for $r_S$, the communications receiver 100 identifies the main path signal and the strongest secondary signals.

After performing this course search for the main path signal and major secondary path signals, it is necessary to estimate the propagation path parameters and delay for each secondary path of interest. The training circuit 200 provides an economical and processing-efficient manner of accomplishing this goal. Essentially, the training circuit 200 may be thought of as comprising an upper branch, fed by $\theta_M$ (main path received symbol phase modulation sample values) and including the summing node 208, and a lower branch fed by $\theta_S$ (secondary path received symbol phase modulation sample values) and including the summing node 210. The upper branch operates on the despread main path signal, while the lower branch operates on the selected despread secondary signal to which the despreading circuitry 140 is currently synchronized. The combined operation of the upper and lower branches of training circuit 200 provides estimations for magnitude r, phase $\theta$, and delay d, for each secondary path signal of interest relative to the main path signal.

The following operations are repeated for each secondary signal of interest. The $PN_S$ sequence offset is set such that the despreading circuitry 140 de-spreads the desired secondary path signal—each of the required PNs sequence offsets corresponding to the secondary signals of interest were identified during the course search. The symbol magnitudes for $r_M$ and $r_S$ are accumulated for K symbols and then compared in the relative magnitude circuit 204. For example, main and secondary path symbols may be accumulated or integrated in integrators 202A and 202B, respectively. The magnitude for the current secondary signal of interest relative to the main path signal is estimated based on dividing the K-sum of $r_S$ over $r_M$. The training circuit 200 provides this estimated relative magnitude "r" as an output value that is used in estimating the secondary propagation path coefficient associated with the current secondary signal. At this point, the relative magnitude for the current secondary signal of interest has been estimated.

The hard-slicer 148 included in the despreading circuit 140 slices the main path signal phase samples according to the modulation constellation involved before they are input to the upper branch of the training circuit 200 as $\theta_M$. Hard-slicing entails adjusting or changing the actual phase value to the closest matching one of a defined set of nominal phase values—essentially, this removes noise from the phase sample. To provide differential decoding for the main path phase samples $\theta_M$, the training circuit 200 includes the delay element 206A, which provides the sliced main path phase sample of the preceding symbol to the inverting input of the summing node 208.

The summing node 208 outputs the difference between the current and previous main path symbols' sliced phase values. The sliced phase of the main path signal is the phase modulation value of the current data symbol subject to possible decision error (the slicing operation). Because the secondary path imposes an unknown phase change on the phase of the current secondary path data symbol ($\theta_S$), the $\theta_S$ phase values are differentially decoded using the delay element 206B and the summing node 210 before hard slicing. The summing node 210 outputs the difference between the current secondary path data symbol's phase and that of the previous symbol.

The received phase of the secondary signal consists of the phase modulation value of the current secondary path data symbol and the channel phase delay of the secondary propagation path. Therefore, the phase delay of the secondary path relative to the main path can be estimated by subtracting the sliced phase of the main path from the received phase of the secondary path. For near post-cursor (within a symbol time), the subtraction of phase values $\theta_M$ and $\theta_S$ is performed immediately on the current main and secondary path data symbols using summing node 216, with the result labeled $\theta_1$.

For pre-cursor delay, the phase delay between the main path signal and the current secondary path signal is estimated based on subtracting the current main path symbol's phase value from the phase value of the preceding secondary path symbol using summing node 214, with the result labeled $\theta_0$. For far post-cursor delay (delay exceeding one symbol time), the phase delay between the main path and the current secondary path is estimated based on subtracting the phase value of the preceding main path symbol from the phase value of the current secondary path symbol using summing node 218, with the result labeled $\theta_2$.

In order to determine which main-to-secondary path relative phase value to use ($\theta\theta_0$, $\theta_1$, or $\theta_2$), the communications receiver 100 must know whether the current secondary signal arises from pre-cursor, or near or far post-cursor echo signal interference. The training circuit 200 provides this information by evaluating the cross-correlation between the main path symbol decision and the current secondary path symbol decision (the hard-sliced, differentially decoded values of $\theta_M$ and $\theta_S$) using a sequence of R received symbols. The cross-correlation is performed, in this exemplary embodiment, with relative lags of −1, 0, and +1 symbols, corresponding to pre-cursor, near post-cursor, and far post-cursor delays, respectively. Differentially decoding the secondary path symbols substantially removes any phase shift relative to the main path induced in the transmitted symbols received through the currently selected secondary propagation path. This results from the secondary path phase change being an essentially constant value that is removed through subtraction. The main path symbols are differentially decoded for consistency of operations in the main-to-secondary path comparison processing.

The summing node 224 provides as its output the difference between the differentially decoded, hard-sliced phase value of the current main path symbol and the differentially decoded, hard-sliced phase value of the previous secondary path symbol. The integrator 230 integrates the absolute value of this signal over R symbols. The summing node 226 provides as its output the difference between the differentially decoded, hard-sliced phase value of the current main path symbol and the differentially decoded, hard-sliced phase value of the current secondary path symbol. The integrator 232 integrates the absolute value of this signal over R symbols. The summing node 228 provides as its output the difference between the differentially decoded, hard-sliced phase value of the previous main path symbol and the differentially decoded, hard-sliced phase value of the current secondary path symbol. The integrator 234 integrates the absolute value of this signal over R symbols.

As a result of the phase-domain operations, the maximum correlation of symbols translates to a minimum value (ideally zero) of phase-minimum phase corresponds to a maximum real component. The minimum picker circuit 236 operates on the output from each of the integrators 230, 232, and 234 to determine which of the integrated signals exhibits the lowest value. The earlier, so-called course search identified the time offset (PN code phase offset index) of each secondary path signal of interest within a symbol time with respect to the main path signal, but could not provide information about actual secondary path time offset (potentially more than a symbol time) without pre/post-cursor information.

With the correlation results from the minimum picker circuit 236, an estimate of the actual secondary path delay for the currently selected secondary path is available. Thus, the output of the minimum picker circuit 236 may be used to set the appropriate equalizer shift register tap offset value ($\hat{\tau}$ in FIGS. 10 and 11), and is further used to set the phase select circuit 220 such that it provides the appropriate phase output ($\theta_0$, $\theta_1$, or $\theta_2$). In operation, the equalizer 130 maintains a running buffer of the last N most-recent hard-sliced phase samples corresponding to the past N received signal samples. Since each successive stage (tap) in shift register 330 corresponds to a successively longer sample time offset delay with respect to the current received signal sample, $\hat{\tau}$ is set for a given path coefficient $\hat{C}$ such that the corresponding shift register 330 tap delay matches or substantially matches the calculated secondary propagation path delay.

Upon completion of these operations, the communications receiver 100, based on practicing an exemplary embodiment of the training method, has determined the required magnitude, phase, and offset (delay) information necessary to configure the equalizer 130 to provide cancellation of the currently selected secondary path signal. More specifically, the communications receiver 100 has the information necessary to estimate the complex coefficient ($\hat{C}$) for the current secondary propagation path. The above process is repeated for each secondary path of interest.

Figure 10:
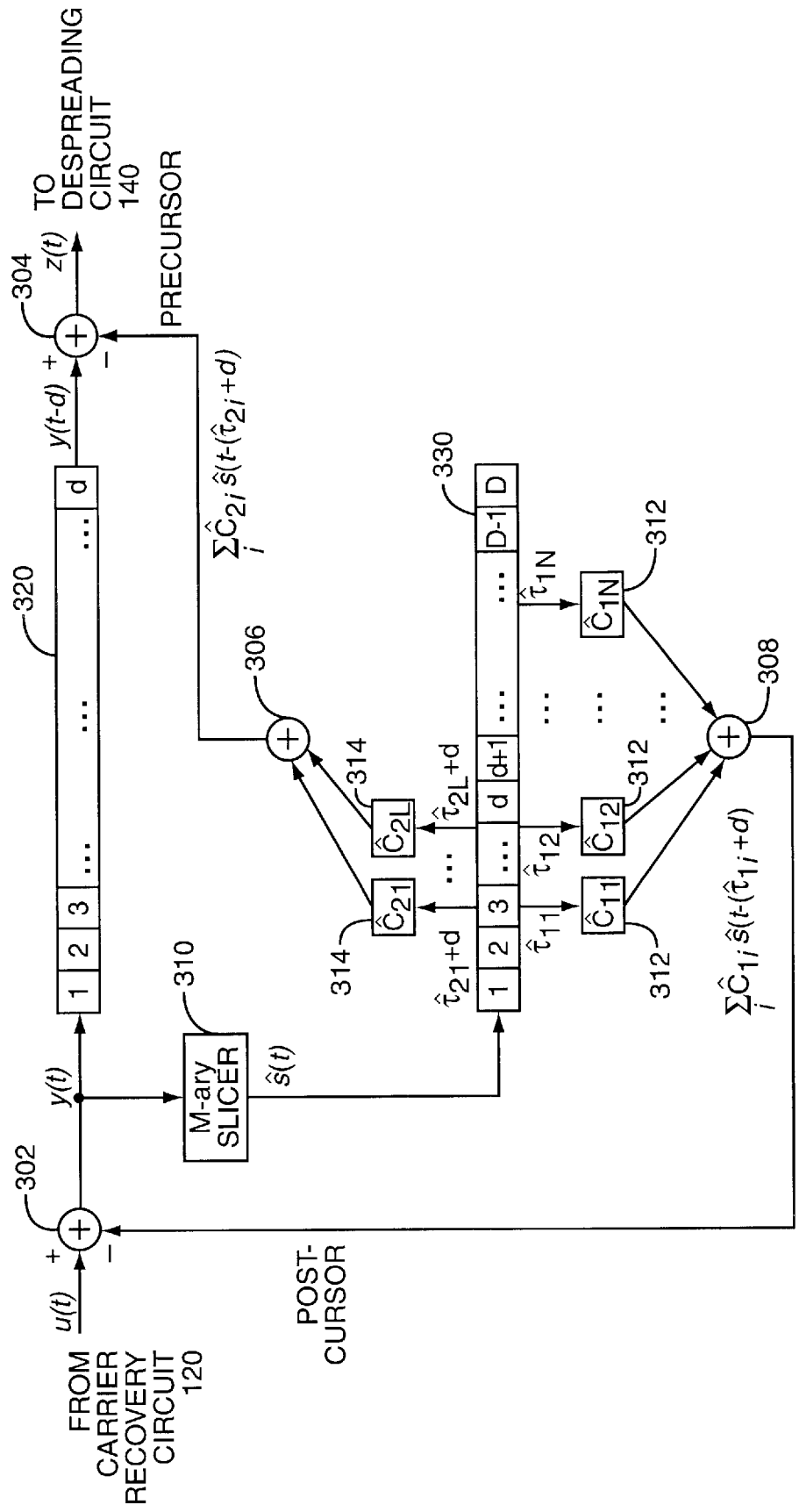
FIG. 10 is a generalized block diagram of an exemplary embodiment of a radio channel equalizer that may be advantageously used in conjunction with the present invention.

FIG. 10 illustrates a generalized exemplary embodiment for the equalizer 130 included in the communications receiver 100. Operating on chip or sub-chip resolution input samples u(t), the equalizer 130 provides pre-cursor and/or post-cursor multipath signal cancellation. Once propagation path parameters are determined—the appropriate estimated delay register tap values ($\hat{\tau}_{21} \ldots \hat{\tau}_{2L}$ and $\hat{\tau}_{1N}$) and complex estimated coefficients ($\hat{C}_{11} \ldots \hat{C}_{1N}$ and $\hat{C}_{2L}$) must be set first—the equalizer 130 compensates received signal samples output from the carrier recovery circuit 120 by canceling out interfering secondary signals caused by multipath phenomena. These compensated received signal samples are output from the equalizer 130 and serve as the input samples to the despreading circuits 140. Thus, once the equalizer 130 is set and activated, the despreading circuits 140 and subsequent baseband processing circuits 170 operate on received signal samples from which equalizer 130 has canceled the major multipath interference.

As illustrated in FIG. 10, the equalizer 130 includes a sample shift register 320, a sliced sample shift register 330, a hard slicer 310, a post-cursor cancellation summing node 302, a pre-cursor cancellation summing node 304, a post-cursor estimated multipath signal summing node 308, a pre-cursor estimated multipath signal summing node 306, and memory elements 312 and 314 for storing post- and pre-cursor estimated secondary propagation path coefficients $\hat{C}_{11} \ldots \hat{C}_{1N}$ and $\hat{C}_{21} \ldots \hat{C}_{2L}$, respectively. The equalizer 130 provides cancellation for up to N post-cursor multipath signals and up to L pre-cursor multipath signals. The equalizer 130 may be modified to vary N and L based on specific design needs. Indeed, the equalizer 130 may be implemented with just pre-cursor multipath cancellation, or with just post-cursor multipath cancellation. Note also that the maximum delay offsets between pre- and post-cursor multipath signals and the main path signal which can be handled by the equalizer 130 are limited only by the lengths of shift register 320 (length d) and shift register 330 (length D), respectively. Thus, the multipath offset delay capability of the equalizer 130 may be easily adjusted in a given design without changing its structure or operation.

The input signal u(t) represents the output from the carrier recovery circuit 120. The signal u(t) comprises multi-bit complex values (real and imaginary) representing discrete, synchronized samples of the received signal taken at chip or sub-chip resolution. The u(t) samples include multipath interference. The equalizer 130 provides multipath interference cancellation based on applying hard-decision logic to the phase value of each sample of u(t) (chip or sub-chip). For example, in DSSS using QPSK, or in 802.11b payload data using CCK, each received symbol or chip takes a symbol value on a QPSK constellation, and the hard-decision may be made by hard-slicing the phase of the received sample in u(t). To cancel post-cursor multipath interference, the hard-sliced chip (or sub-chip) decision(s) is fed back with the proper delay(s) (e.g., $\tau_{1i}$) and multiplicand coefficient(s) (e.g., $C_{1i}$) for subtraction from u(t) in summing node 302. This aspect of operation is conceptually similar to more conventional Decision Feedback Equalizers (DFE), which are well understood in the art.

Looking specifically at post-cursor multipath interference, we can represent the received samples (chip or sub-chip resolution) in u(t) as the sum of the main path signal s(t), which is defined as the signal with the greatest magnitude, and post-cursor secondary path signals with delays $\tau_{1i}$ and corresponding complex coefficients $C_{1i}$ (with $|C_{1i}| \leq 1$). From this perspective, we may represent the received signal samples comprising u(t) as $$r(t) = s(t) + \sum_i C_{1i} s(t - \tau_{1i})$$

Thus, the output y(t) from the post-cursor cancellation summing node 302 may be represented as u(t) minus the estimated post-cursor multipath signals as follows, $$y(t) = r(t) - \sum_i \hat{C}_{1i} \hat{s}(t - \hat{\tau}_{1i})$$

Where $\hat{C}_{1i}$ and $\hat{\tau}_{1i}$ are the estimated complex secondary path coefficients and corresponding secondary propagation path delay estimates, respectively, developed during training, and where $\hat{s}(t)$ is the hard-sliced sample decision given by $\hat{s}(t)$=slice[y(t)]. Note that the slicer 310 performs its hard-decision slicing operation after cancellation of post-cursor multipath signals.

Note that the number of shift register stages comprising the sliced sample shift register 330 combined with the input sample resolution (chip or sub-chip) determines the maximum multipath signal delay accommodated by the structure of equalizer 130. As illustrated, shift register 330 has D stages. This provides the equalizer 130 with the ability to cancel post-cursor multipath signals offset from the main path signal by up to D/x chip times, where x represents the sample resolution of u(t)—that is, the number of samples per chip in u(t). As an example, assume that u(t) is at half-chip resolution, or two samples per received DSSS chip, and further assume D=32 stages. With these values, the equalizer 130 accommodates multipath delays up to 32/2 or 16 chip times. In 802.11b CCK-mode transmissions, this equates to two symbol periods of multipath delay capability (CCK modulation uses 8 chips per symbol in 802.11b).

Pre-cursor multipath delay cancellation requires sample shift register 320 and the corresponding pre-cursor multipath cancellation summing node 304. In pre-cursor multipath interference, the echo signal arrives before the main path signal, thus the $\hat{\tau}_{21}$ values are negative. The length d of shift register 320 determines the maximum pre-cursor multipath delay accommodated by the equalizer 130, in a manner similar to that explained for post-cursor delay capability. With depth d=8 and at 2 samples-per-chip input resolution, the equalizer 130 provides multipath cancellation for pre-cursor signals delayed from the main path signal by up to 8/2 or 4 chip times. Of course, pre- and post-cursor delay handling capability may be easily adjusted to suit the needs of a specific application simply by altering the length of either or both the shift registers 320 and 330.

Focusing now on an expression for the input signal y(t−d) only in the context of pre-cursor multipath interference—ignoring any post-cursor cancellation operation performed on u(t) to form y(t)-we can express y(t−d) as, $$y(t-d) = s(t-d) + \sum_i C_{2i} s(t - (\tau_{2i} + d))$$

Thus, the output z(t) from the pre-cursor cancellation summing node 304 may be represented as y(t–d) minus the estimated pre-cursor multipath signals as follows, $$z(t) = y(t-d) - \sum_i \hat{C}_{2i} \hat{s}(t - (\hat{\tau}_{2i} + d))$$

Where $\hat{C}_{2i}$ and $\hat{\tau}2i$ are the complex coefficent estimates and delay estimates developed during equalizer training, and $\hat{s}(t)$ is the hard—sliced sample decision, $\hat{s}(t)$=slice [y(t)].

The equalizer 130 advantageously avoids complex multiplications regarding the hard-sliced samples $\hat{s}(t)$ held in shift register 330 and the estimated complex coefficients $\hat{C}\hat{C}_{1i}$ and $\hat{C}_{2i}$. Rather than multiplying the $\hat{s}(t)$ sample held in a particular shift register stage by one of the estimated coefficients ($\hat{C}_{1i}$ or $\hat{C}_{2i}$), the hard-sliced value of $\hat{s}(t)$ is used to simply "rotate" the phase of the complex coefficient.

Hard-slicing the y(t) samples with slicer 310 produces sliced samples $\hat{s}(t)$ from which the noise is removed. The operation of slicer 310 produces output samples having one of a defined set of values corresponding to the constellation points defined by the communications system modulation scheme. For example, in an 802.11b CCK scheme, the slicer 310 operates as a QPSK slicer, processing the y(t) samples to produce $\hat{s}(t)$ output samples having the closest matching ideal QPSK constellation values (namely, ±1, or ±j). Thus, the feedback (feedforward) signals for post-cursor (pre-cursor) multipath signal cancellation represent the ideal estimated multipath signal rather than the estimated multipath signal + sample noise. This avoids adding noise in the feedback or feedforward signals with the instantaneous noise in the current u(t) or y(t–d) sample values.

Figure 11:
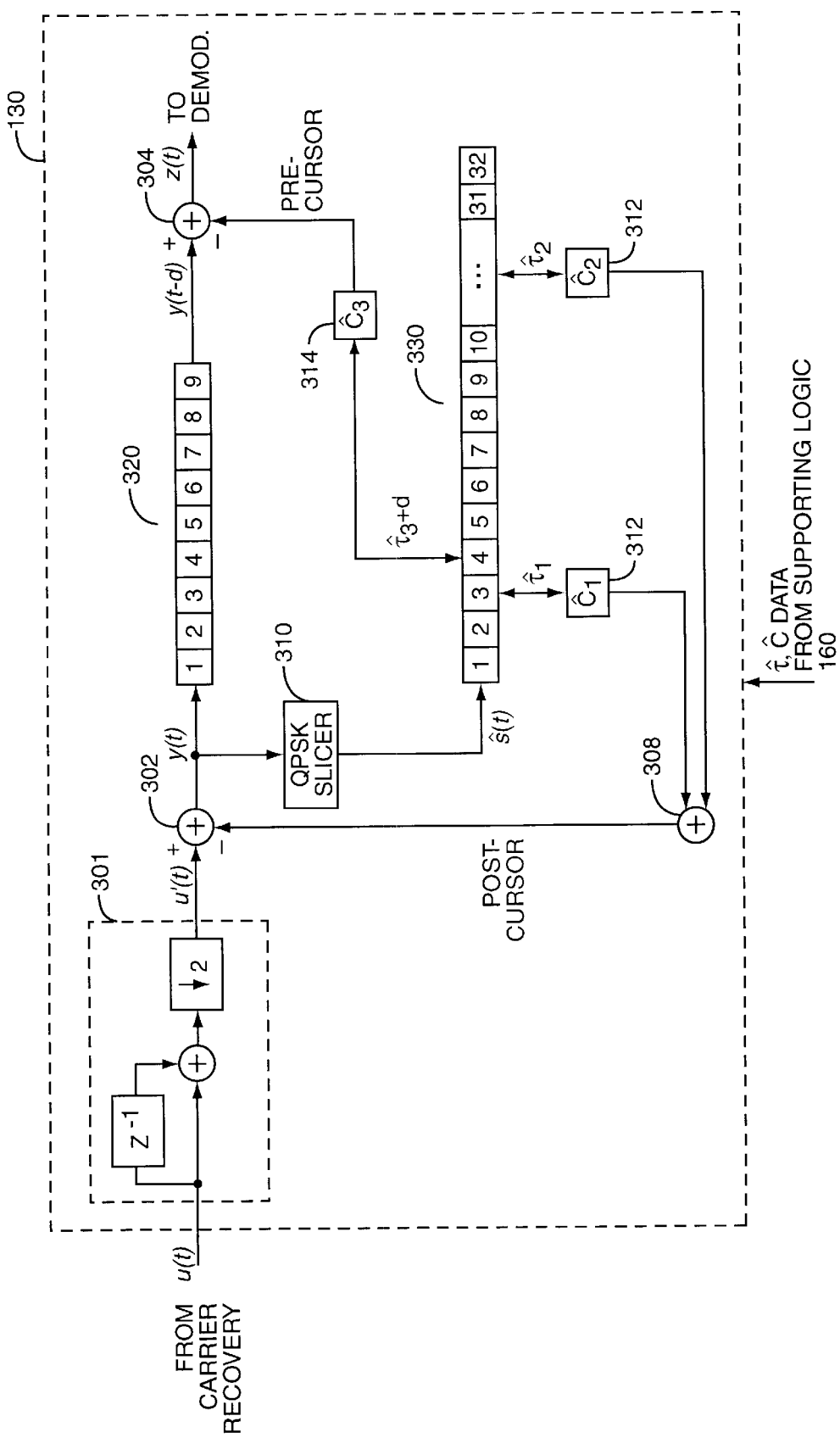
FIG. 11 is an alternate exemplary embodiment of the equalizer of FIG. 10.

FIG. 11 illustrates an exemplary implementation of the equalizer 130 designed for multipath signal cancellation in an 802.11b environment. In exemplary embodiments of the communications receiver 100, the received DSSS/PSK signal is converted from analog-to-digital format at 5 bits of resolution, but the particular resolution used is not critical to practicing the present invention. Continuing the 802.11b example, the input to the equalizer 130 comprises complex digital values representing quarter chip samples of QPSK-modulated chips at 8 chips per symbol. (This corresponds to the CCK-modulated payload data of an 802.11b data packet and assumes that the equalizer 130 has already been trained—configured using the training method of the present invention, as described earlier herein—during the lower data rate header/preamble portions of the 802.11b packet.) Thus, u(t) represents a stream of 5-bit complex signal samples, that, in an exemplary embodiment, are taken at quarter-chip resolution (4 samples per received QPSK-modulated chip) and represent a sampling rate of 44 MHz.

As shown in FIG. 11, the equalizer 130 includes an optional decimation block 301 on its input to adjust its sampling rate to be compatible with a wide range of sub-chip input sample resolutions. The decimation block 301 may be configured to decimate the input signal u(t) as required to provide u(t)' having the desired sample resolution (chip or sub-chip). As illustrated, decimation block 301 decimates the quarter-chip resolution input signal u(t) by a factor of two to form the half-chip resolution input signal u(t)' with a sample rate of 22 MHz. Note that the equalizer 130, as depicted in FIG. 10, provides multipath signal compensation for two post-cursor echo signals or one post- and one pre-cursor echo signals.

Operation of the equalizer 130 depicted in FIG. 11 is consistent with the discussion relating to FIG. 10. The equalizer 130 uses the sliced sample register 330 in combination with the summing circuit 302 to provide post-cursor multipath signal cancellation. As illustrated, the feedback paths including complex coefficients $C_1$ and $C_2$ provide for cancellation of up to two post-cursor multipath signals. The post-cursor delay offsets $\tau_1$ and $\tau_2$ correspond to the delay offsets between main path and post-cursor multipath signals as determined during equalizer training.

FIG. 11 also illustrates cancellation capability for one pre-cursor multipath signal, based on using the sample shift register 320 and the corresponding summing node 304. As illustrated, the feed-forward path including the complex coefficient $\hat{C}_3$ provides for cancellation of a single pre-cursor multipath signal. (The novel structure of the equalizer 130 allows deletion of pre-cursor multipath cancellation by eliminating the shift register 320 and the summing circuit 304 without interfering with the basic post-cursor cancellation structure.) The half-chip resolution complex samples u(t)' are compensated for post-cursor multipath interference in summing circuit 302. For example, assume that equalizer training identified a post-cursor multipath signal offset from the main path signal by one-and-a-half (1.5) chip times as the one secondary event, and further identified a pre-cursor multipath signal offset by two-and-a-half (2.5) chip times from the main path signal as another secondary event. With a 2-chips per sample shift rate, $\hat{\tau}_3$=4−9=−5, which represents the offset (4) into the sliced sample register 330 minus the depth (9) of the delayed sample register 320 required to provide 2.5 chip times of precursor delay. Continuing the example, the supporting logic 160 in conjunction with the baseband processor 170 sets the estimated complex coefficients $\hat{C}_1$ and $\hat{C}_3$ and estimated offset delays $\hat{\tau}_1$ and $\hat{\tau}_3$ by methods earlier described—$\hat{C}_2$ and $\hat{\tau}_2$ would not be used in this specific example. For the $i^{th}$ u(t)' input sample, the ($i^{th}$−3) delayed sample ($\hat{\tau}_1$=3) is "subtracted" from the input sample, thereby canceling the secondary multipath event corresponding to this secondary propagation path delay. As earlier explained, the complex coefficients are phase rotated based on the hard-sliced sample value contained in the shift register stage corresponding to delays ($\hat{\tau}$) associated with the coefficients, and then subtracted from u(t)' or y(t–d).

Actual radio channel characteristics, required bit rates, and communications system requirements determine the optimal structure of the equalizer 130 in specific designs. FIG. 10 illustrates a generalized realization of the equalizer 130 preferably included within the communications receiver 100, while FIG. 11 provides a more specific example in the context of 802.11b CCK-mode multipath signal interference cancellation. FIG. 11 corresponds to an embodiment of the training method wherein only the two strongest multipath signals are canceled—either two post-cursor or one pre-cursor and one post-cursor echo signal.

Note that operating with a greater number of samples per chip provides better multipath delay resolution, but requires greater shift register depth to provide the same multipath signal delay spread capability. Those skilled in the art will recognize that shift register depth must be balanced against multipath event time resolution based on individual design requirements. The equalizer 130 easily accommodates such design-specific changes without requiring structural changes. More specifically, the need for increased or decreased multipath signal delay capability may be handled by simply adjusting the length of shift registers 320 and 330.

Because post-cursor multipath delay ranges can be much longer than pre-cursor multipath delay ranges, there is a real advantage in extending the length of the post-cursor cancellation shift register 330 well beyond that of the pre-cursor cancellation shift register 320. If the full bit resolution of the individual complex samples (sub-chip or chip samples) was used for the post-cursor cancellation shift register 330, an extended length shift register, as is required for spanning multi-symbol delays, would consume considerable circuit resources because of the need to store full-resolution samples (e.g., 12 bits) rather than reduced-resolution samples. For example, hard-slicing the y(t) samples to produce the ŝ(t) samples reduces the required width of shift register 330 to just two bits for QPSK signals, to represent the 1-of-4 nominal phase values used in QPSK modulation. (In general, hard-slicing reduces the sliced samples to n bits where $2^n = M$ in M-ary modulation schemes.)

The training method of the present invention offers substantial opportunity for variation without departing from the spirit and scope of the invention. For example, details regarding the communications receiver 100 are not critical to practicing the training method. Virtually any combination of methods and supporting apparatus for despreading and synchronizing with the main path signal and selectable ones of the secondary path signals is compatible with the training method disclosed herein. Thus, operations associated with the training method of the present invention may be implemented in a variety of communications receiver architectures, and in a variety of communications system types. Further, while the disclosed training circuit 200 represents an exemplary apparatus for practicing the training method, other circuit implementations are possible and perhaps even desirable, depending upon the requirements of a given communications system.

With regard to its implementation details, the training method offers significant opportunity for variation. Understandably, substantial variation potentially arises with regard to the particular communications receiver architecture used to implement or support the training method. It should be understood that the communications receiver 100 illustrated and described herein represents only an exemplary platform for practicing an exemplary embodiment of the training method of the present invention. Other architectures are possible, or even preferred, depending upon design and system requirements. Thus, ancillary operations associated with discriminating (despreading or selectively receiving) secondary and main signals may vary as a function of associated receiver circuitry.

Further, the training method may be practiced with variations of the PN code phase stepping resolution used during the course search for secondary path signals of interest. Also, as earlier noted, the number of secondary signals chosen for characterization relative to the main signal may vary widely with particular system requirements. Similarly, the number of received signal (main and secondary) samples values accumulated for relative magnitude operations is subject to wide variation. In some systems, a single magnitude sample from the main and currently selected magnitude sample may be used for comparison, while in other systems, many samples may be accumulated to improve the accuracy of the relative magnitude value. Similar variation is possible with regard to the number of phase values samples used in correlation and phase comparison operations. Even the approach of characterizing one secondary signal at a time may be varied, depending upon supporting circuit resources.

As the number of secondary signals characterized may vary, so too the range of time offset between main and secondary signals accommodated by the training method may vary. Thus, variations on the extent of multipath delay (either pre- or post-cursor) are well within the scope of the present invention. Correlation operations may be modified to cover a desired range of current, preceding, and succeeding ones in concurrent sequences of main and secondary signal symbols. With the ability to determine secondary signal time offsets extending beyond one symbol time relative to the main signal and, therefore, accurately determine secondary signal phase shift relative to the main signal, the training method of the present invention provides an advantageous approach to characterizing secondary signals in a multipath reception environment without limitations regarding secondary signal delay spread.

The present training method potentially provides advantages to a broad range of communications systems subject to multipath signals. The training circuit 200 and training method of the present invention are particularly advantageous for use as the basis of multipath signal interference cancellation in spread spectrum systems utilizing spreading codes with poor auto- and cross-correlation characteristics, as conventional RAKE receiver techniques works poorly in such applications. As such, the present invention may be used to significant advantage in 802.11b wireless LAN systems. However, the present invention may also be advantageously applied in RAKE receiver architectures, or, indeed, applied in any DSSS communications system for which multipath signal characterization and/or cancellation benefits receiver performance.

The foregoing details should, in all respects, be considered as exemplary rather than as limiting. The present invention allows significant flexibility in terms of implementation and operation. Examples of such variation are discussed in some detail above; however, such examples should not be construed as limiting the range of variations falling within the scope of the present invention. The scope of the present invention is limited only by the claims appended hereto, and all embodiments falling within the meaning and equivalency of those claims are embraced herein.

What is claimed is:

1. A method of characterizing a secondary signal propagation path relative to a main signal propagation path, said method comprising:

(a) receiving a first multipath signal that includes a main path signal received through said main signal propagation path and a secondary path signal through said secondary signal propagation path;

(b) comparing a magnitude of said secondary path signal with a magnitude of said main path signal to determine a relative magnitude of said secondary path signal to said main path signal;

(c) identifying corresponding symbols in said main and secondary path signals;

(d) comparing said corresponding symbols in said main path and secondary path signals to determine a relative time offset between said secondary path signal and said main path signal; and (e) comparing corresponding symbols in said main and secondary path signals to determine a relative phase of said secondary path signal to said main path signal;

wherein said relative magnitude, time offset, and phase determined for said first multipath signal are used to improve reception performance for a subsequent multipath signal received through said main and secondary signal propagation paths.

2. The method of claim 1 wherein said comparing a magnitude of said secondary path signal with a magnitude of said main path signal to determine a relative magnitude of said secondary path signal to said main path signal comprises concurrently accumulating a sequence of magnitude samples from said main and secondary path signals, and then determining a ratio between an accumulated secondary path magnitude and an accumulated main path magnitude.

3. The method of claim 1 wherein said identifying corresponding symbols in said main and secondary path signals comprises cross-correlating at least one main path symbol with selected ones of said secondary path symbols, and wherein a maximum correlation value indicates respective ones of said secondary path symbols that correspond to respective ones of said main path symbols.

4. The method of claim 3 wherein said cross-correlating said at least one main path symbol with selected ones of said secondary path symbols comprises a first correlation between a phase value of a main path symbol and a phase value of a concurrent secondary path symbol, a second correlation between said phase value of said main path symbol and a phase value of a preceding secondary path symbol, and a third correlation between a phase value of a preceding main path symbol and said phase value of said concurrent secondary path symbol.

5. The method of claim 4 wherein said maximum correlation is selected as a maximum one of said first, second, and third correlations.

6. The method of claim 3 further wherein said identifying corresponding symbols in said main and secondary path signals comprises differentially decoding said main and secondary path symbols to substantially remove a phase offset induced in said secondary path symbols relative to said main path symbols before said cross-correlating one or more main path symbols with selected ones of said secondary path symbols.

7. The method of claim 6 further comprising slicing a phase value of each said main path symbol to a closest matching one in a defined set of nominal phase values before said differentially decoding said main and secondary path symbols.

8. The method of claim 6 further comprising slicing phase values of said secondary path symbols to closest matching ones in a defined set of nominal phase values after said differentially decoding said main and secondary path symbols.

9. The method of claim 1 wherein said comparing said corresponding symbols in said main path and secondary path signals to determine a relative time offset between said secondary path signal and said main path signal comprises determining a time offset between symbols received via said main path signal and corresponding symbols received via said secondary path signal, said time offset indicating a number of symbol times that said secondary path signal leads or lags said main path signal, or indicates if said secondary path signal is aligned within one symbol time of said main path signal.

10. The method of claim 1 wherein comparing corresponding symbols in said main and secondary path signals to determine a relative phase of said secondary path signal to said main path signal comprises determining one or more phase differences between a phase value of a main path symbol and one or more phase values associated with said corresponding secondary path symbol and one or more sequentially adjacent secondary path symbols.

11. The method of claim 1 wherein said first multipath signal results from a transmit signal transmitted using a single PN spreading code and said second multipath signal results from a transmit signal transmitted using multiple PN spreading codes.

12. The method of claim 11 further comprising forming a secondary path coefficient corresponding to said secondary signal propagation path based on said relative magnitude and phase and compensating said subsequent multipath signal using said secondary path coefficient and said relative time offset to substantially remove a secondary path signal associated with said secondary signal propagation path from said subsequent multipath signal.

13. The method of claim 11 wherein said first multipath signal is a preamble and header portion of an 802.11b data packet and said subsequent multipath signal is a payload portion of said 8021.11b data packet.

14. The method of claim 1 further comprising combining said relative phase and magnitude to form a secondary path coefficient and storing said secondary path coefficient and said relative time offset for subsequent use.

15. The method of claim 14 further comprising:
(a) generating a first sample of said subsequent multipath signal;
(b) offsetting said first sample of said subsequent multipath signal from a later sample of said subsequent multipath signal by said relative offset time,
(c) applying said secondary path coefficient associated with said secondary path signal to said first sample; and
(d) subtracting said first sample from said later sample to substantially remove an effect of said secondary path signal in said subsequent multipath signal on said later sample.

16. The method of claim 15 further comprising searching said first multipath signal to identify one or more additional secondary signals contained in said received multipath signal to identify associated one or more secondary signal propagation paths.

17. The method of claim 16 further comprising:
(a) determining said complex coefficients and said relative time offsets for a selected number of said one or more additional secondary path signals;
(b) generating a number of first samples of said subsequent multipath signal;
(c) offsetting said first samples of said subsequent multipath signal from a later sample of said subsequent received multipath signal by respective ones of said relative offset times;
(d) applying respective ones of said secondary path coefficients associated with said selected number of one or more additional secondary path signals to respective ones of said first samples; and
(e) subtracting said first samples from said later sample to substantially remove an effect of said selected number of one or more secondary path signals in said subsequent multipath signal on said later sample.

18. A method of processing a received multipath signal that includes a main path signal and at least one secondary path signal, said method comprising:
(a) while receiving a first portion of said received multipath signal:
(i) measuring signal magnitudes for two or more signals within said received multipath signal to identify a strongest signal as said main path signal, and at least one next-strongest signal as said at least one secondary path signal; and
(ii) calculating a relative magnitude, phase, and time offset for said at least one secondary path signal relative to said main path signal; and (b) while receiving a second portion of said received multipath signal:
  (i) generating at least one estimated secondary path signal corresponding to said at least one secondary path signal using said relative magnitude phase, and time offset; and
  (ii) combining said at least one estimated secondary path signal with said received multipath signal to substantially cancel said at least one secondary path from said received multipath signal.

19. The method of claim 18 further comprising processing said received multipath signal using a known PN code sequence during said receiving said first portion of said received multipath signal, wherein said first portion of said received multipath signal is a spread spectrum signal spread using said known PN code sequence.

20. The method of claim 19 further comprising processing said received multipath signal using different ones in a known set of PN code sequences daring said receiving said second portion of said received multipath signal, wherein said second portion of said received multipath signal is a spread spectrum signal spread using said different ones in said known set of PN code sequences.

21. The method of claim 20 wherein said first portion of said received multipath signal comprises a PSK-modulated direct-sequence spread spectrum signal and said second portion comprises a CCK-modulated direct-sequence spread spectrum signal.

22. The method of claim 18 wherein sad fist portion of sad received multipath signal is a preamble and header of an 802.11b data packet and said second portion is a payload of said 802.11b data packet.

23. The method of claim 18 wherein said measuring a signal magnitude for two or more signals within said received multipath signal to identify a strongest signal as said main path signal, and at least one next-strongest signal as said at least one secondary path signal comprises forming at least one magnitude sample for a number of signals in said received multipath signal and determining relative strengths of said number of signals based on said magnitude samples.

24. The method of claim 18 wherein said calculating a relative magnitude, phase, and time offset for said at least one secondary path signal relative to said main path signal comprises calculating said relative magnitudes based on concurrently accumulating a sequence of magnitude samples from said main and at least one secondary path signals, and then determining a ratio between an accumulated secondary path signal magnitude for each of said at least one secondary path signals and a concurrently accumulated main path signal magnitude.

25. The method of claim 18 wherein said calculating a relative magnitude, phase, and time offset for said at least one secondary path signal relative to said main path signal further comprises calculating said relative time offset based on correlating respective ones in a sequence of symbol values received via said main path signal with respective ones in a sequence of symbol values concurrently received via said at least one secondary path signal.

26. The method of claim 25 further comprising differentially decoding said respective ones in said sequences of symbol values received via said main path signal and said at least one secondary path signal to remove a phase shift from said symbol values received via said secondary path signal relative to said symbol values received via said main path signal before said correlating respective ones in a sequence of symbol values received via said main path signal with respective ones in a sequence of symbol values concurrently received via said at least one secondary path signal.

27. The method of claim 26 further comprising slicing each said symbol value received via said main path signal to a closest matching one in a defined set of nominal symbol values before said differentially decoding said respective ones in said sequences of symbol values received via said main path signal and said at least one secondary pat signal to remove a phase shift from said symbol values received via said at least one secondary path signal.

28. The method of claim 27 further comprising slicing said symbol values received via said at least one secondary path signal to closest matching ones in a defined set of nominal symbol values after said differentially decoding said respective ones in said sequences of symbol values received via said main path signal and said at least one secondary path signal to remove a phase shift from said symbol values received via said at least one secondary path signal.

29. The method of claim 28 further comprising cross correlating said respective ones in said sequences of symbol values received via said main path signal and said at least one secondary path signal after said differential decoding and slicing of said sequences of symbol values received via said no path signal and said at least one secondary path signal to determine a symbol correspondence between said sequence of symbols received via said at least one secondary path signal relative to said sequence of symbols received via said main path signal.

30. The method of claim 29 further comprising determining said relative time offset for said at least one secondary path signal based determining a time offset between symbol values received via said main path signal and corresponding symbol values received via said secondary path signal, said time offset indicating a number of symbol times that said secondary path signal leads or lags said main path signal, or indicates if said secondary path signal is aligned within one symbol time of said main path signal.

31. The method of claim 30 further comprising determining said relative phase shift for said at least one secondary path signal based on said symbol correspondence and a comparison of symbol values between respective ones in a sequence of symbol values received via said main path signal and respective ones in a sequence of symbol values concurrently received via said at least one secondary path signal.

32. The method of claim 18 wherein said combining said at least one estimated secondary path signal with said received multipath signal to substantially cancel said at least one secondary path from said received multipath signal comprises offsetting in time from said received multipath signal said at least one estimated secondary path signal by said relative time offset before subtracting said at least one estimated secondary path signal from said received multipath signal.

33. The method of claim 32 further comprising performing said measuring signal magnitudes for two or more signals within said received multipath signal, wherein said received multipath signal comprises an 802.11b data packet, to identify a strongest signal as said main path signal, and at least one next-strongest signal as said at least one secondary path signal and said calculating a relative magnitude, phase, and time offset for said at least one secondary path signal relative to said main path signal during a preamble and header portion of said 802.11b data packet.

34. The method of claim 33 further comprising performing said generating at least one estimated secondary path signal corresponding to said at least one secondary path signal using said relative magnitude phase, and time offset and said combining said at least one estimated secondary path signal with said received multipath signal to substantially cancel said at least one secondary path from said received multipath signal during a payload portion of said 802.11b data packet.

35. A method of estimating propagation parameters for at least one secondary signal propagation path, said method comprising:

receiving a first signal through multiple signal propagation paths, including a main propagation path and at least one secondary propagation path;

selectively despreading said first signal to identify a main and at least one secondary path signal associated with receiving said first signal through said main and at least one secondary signal propagation path;

comparing symbol sequence concurrently received in said main and at least one secondary path signals determine propagation path parameters for said at least one secondary signal propagation path relative to said main signal propagation path;

subsequently receiving a second signal through said main and at least one secondary signal propagation paths; and applying said propagation path parameters to said second signal to substantially cancel an effect of a least one secondary signal associated with receiving said second signal through said at least one secondary signal propagation path.

36. A system for compensating a received multipath signal comprising:

a means for receiving a first multipath signal;

a means for identifying a strongest signal within said first multipath signal as a main propagation path signal corresponding to a main signal propagation path and identifying one or more next-strongest sills within said first multipath signal as one or more secondary propagation path signals corresponding to one or more secondary signal propagation paths;

a means for comparing a portion of said main propagation path signal to concurrent portions of each of said secondary propagation path signals to determine a relative phase, magnitude, and time offset for said secondary propagation path signals to said main propagation path signal;

a means for receiving a second multipath signal;

a means for creating secondary signal estimates for said second multipath signal corresponding to one or more secondary propagation path signals received through said one or more secondary signal propagation paths based on said relative phase, magnitude, and time offsets determined for said second propagation path signals in said first multipath signal; and a means for subtracting said secondary signal estimates from said second multipath signal to substantially remove an effect of said one or more secondary path signals associated with said second multipath signal from said second multipath signal.

* * * * *